United States Patent
Sugio et al.

(10) Patent No.: US 11,197,015 B2
(45) Date of Patent: Dec. 7, 2021

(54) MOVING PICTURE CODING METHOD AND MOVING PICTURE DECODING METHOD

(71) Applicant: Sun Patent Trust, New York, NY (US)

(72) Inventors: Toshiyasu Sugio, Osaka (JP); Takahiro Nishi, Nara (JP); Youji Shibahara, Tokyo (JP); Hisao Sasai, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 16/852,651

(22) Filed: Apr. 20, 2020

(65) Prior Publication Data

US 2020/0244987 A1    Jul. 30, 2020

Related U.S. Application Data

(63) Continuation of application No. 16/353,312, filed on Mar. 14, 2019, now Pat. No. 10,666,967, which is a
(Continued)

(51) Int. Cl.
*H04N 19/513* (2014.01)
*H04N 7/01* (2006.01)
(Continued)

(52) U.S. Cl.
CPC ......... *H04N 19/513* (2014.11); *H04N 19/105* (2014.11); *H04N 19/124* (2014.11);
(Continued)

(58) Field of Classification Search
CPC ........ H04N 19/51; H04N 19/52; H04N 19/43; H04N 19/513; H04N 7/014; H04N 7/0157; H04N 19/139
(Continued)

(56) References Cited

U.S. PATENT DOCUMENTS 5,699,128 A * 12/1997 Hayashi ............... H04N 19/577
                                                                348/699
2003/0174769 A1    9/2003 Nagumo
(Continued)

FOREIGN PATENT DOCUMENTS

JP    2004-129191       4/2004
KR    1020080114650    11/2010
WO    2009/126260     10/2009

OTHER PUBLICATIONS

International Search Report dated May 1, 2012 in International Application No. PCT/JP2012/000424.
(Continued)

*Primary Examiner* — Jeffery A Williams
(74) *Attorney, Agent, or Firm* — Wenderoth, Lind & Ponack, L.L.P.

(57) ABSTRACT

A moving picture coding apparatus includes a co-located block information determination unit which determines which one of a forward reference block and a backward reference block will be a co-located block and further determines whether only the unidirectional motion vector of the motion vectors of the co-located block is to be stored in a colPic memory; a temporal motion vector predictor calculation unit which derives a candidate motion vector predictor in temporal motion vector predictor mode using the colPic information stored in the colPic memory; and an inter prediction control unit which determines to code a motion vector using a candidate motion vector predictor having least error from the motion vector derived by motion estimation among candidate motion vector predictors.

6 Claims, 27 Drawing Sheets

Related U.S. Application Data continuation of application No. 15/354,416, filed on Nov. 17, 2016, now Pat. No. 10,440,382, which is a continuation of application No. 13/980,450, filed as application No. PCT/JP2012/000424 on Jan. 24, 2012, now Pat. No. 9,532,050.

(60) Provisional application No. 61/435,932, filed on Jan. 25, 2011.

(51) Int. Cl.

| | | |
|---|---|---|
| *H04N 19/139* | (2014.01) | |
| *H04N 19/52* | (2014.01) | |
| *H04N 19/43* | (2014.01) | |
| *H04N 19/51* | (2014.01) | |
| *H04N 19/105* | (2014.01) | |
| *H04N 19/124* | (2014.01) | |
| *H04N 19/159* | (2014.01) | |
| *H04N 19/61* | (2014.01) | |
| *H04N 19/172* | (2014.01) | |
| *H04N 19/176* | (2014.01) | |

(52) U.S. Cl.
CPC ........... *H04N 19/159* (2014.11); *H04N 19/43* (2014.11); *H04N 19/51* (2014.11); *H04N 19/52* (2014.11); *H04N 19/61* (2014.11); *H04N 19/172* (2014.11); *H04N 19/176* (2014.11)

(58) Field of Classification Search
USPC .................................................. 375/240.16
See application file for complete search history.

(56) References Cited

U.S. PATENT DOCUMENTS

| | | |
|---|---|---|
| 2004/0066848 A1 | 4/2004 | Jeon |
| 2004/0146109 A1 | 7/2004 | Kondo |
| 2005/0129118 A1 | 6/2005 | Jeon |
| 2005/0129119 A1 | 6/2005 | Jeon |
| 2005/0129120 A1 | 6/2005 | Jeon |
| 2006/0285596 A1* | 12/2006 | Kondo ................ H04N 19/54 375/240.16 |
| 2008/0031332 A1 | 2/2008 | Jeon |
| 2008/0031341 A1 | 2/2008 | Jeon |
| 2008/0031342 A1 | 2/2008 | Jeon |
| 2008/0031343 A1 | 2/2008 | Jeon |
| 2008/0037639 A1 | 2/2008 | Jeon |
| 2008/0037640 A1 | 2/2008 | Jeon |
| 2008/0037644 A1 | 2/2008 | Jeon |
| 2009/0067497 A1 | 3/2009 | Jeon |
| 2009/0067498 A1 | 3/2009 | Jeon |
| 2009/0067499 A1 | 3/2009 | Jeon |
| 2009/0067500 A1 | 3/2009 | Jeon |
| 2009/0074062 A1 | 3/2009 | Jeon |
| 2009/0074063 A1 | 3/2009 | Jeon |
| 2009/0074064 A1 | 3/2009 | Jeon |
| 2009/0074065 A1 | 3/2009 | Jeon |
| 2009/0074066 A1 | 3/2009 | Jeon |
| 2009/0074067 A1 | 3/2009 | Jeon |
| 2009/0074068 A1 | 3/2009 | Jeon |
| 2009/0074069 A1 | 3/2009 | Jeon |
| 2011/0261882 A1 | 10/2011 | Zheng et al. |
| 2012/0082229 A1 | 4/2012 | Su |
| 2012/0106645 A1* | 5/2012 | Lin ..................... H04N 19/56 375/240.16 |
| 2013/0215967 A1 | 8/2013 | Jeon |
| 2014/0098870 A1 | 4/2014 | Jeon |
| 2014/0098871 A1 | 4/2014 | Jeon |
| 2014/0098872 A1 | 4/2014 | Jeon |
| 2014/0098873 A1 | 4/2014 | Jeon |
| 2014/0098874 A1 | 4/2014 | Jeon |
| 2014/0098875 A1 | 4/2014 | Jeon |
| 2015/0264394 A1 | 9/2015 | Jeon |

OTHER PUBLICATIONS

"Advanced video coding for generic audiovisual services", ITU-T Recommendation H. 264, Mar. 2010.

Yeping Su and Andrew Segall, On motion vector competition, Joint Collaborative Team on Video Coding (JCT-VC) of ITU-T SG16 WP3 and ISO/IEC JTC1/SC29/WG11 3rd Meeting: Guangzhou, CN, Document: JCTVC-C257, ITU-T, Oct. 2010.

Yeping Su and Andrew Segall, CE9: Reduced resolution storage of motion vector data, Joint Collaborative Team on Video Coding (JCT-VC) of ITU-T SG16 WP3 and ISO/IEC JTC1/SC29/WG11 4th Meeting: Daegu, KR, Document: JCTVC-D072, ITU-T, Jan. 20-28, 2011.

Test Model under Consideration Output Document (draft007), Joint Collaborative Team on Video Coding (JCT-VC) of ITU-T SG16 WP3 and ISO/IEC JTC1/SC29/WG11 2nd Meeting: Geneva, CH, Document: JCTVC-B205, ITU-T, Oct. 2010, p. 78-93.

Byeong-Moon Jeon, Direct mode in B pictures, Joint Video Team (JVT) of ISO/IEC MPEG & ITU-T VCEG (ISO/IEC JTC1/SC29/WG11 and ITU-T SG16 Q.6) 4th Meeting: Klagenfurt, Austria, Contribution: JVT-D056, ITU-T, Jul. 2002.

Jiali Zheng et al., Extended Direct Mode for Hierarchical B Picture Coding, IEEE International Conference on Image Processing, 2005. ICIP 2005., Sep. 11, 2005, vol. 2, p. II-265-268.

Toshiyasu Sugio and Takahiro Nishi, "Modified derivation process of temporal motion vector predictor", Joint Collaborative Team on Video Coding (JCT-VC) of ITU-T SG16 WP3 and ISO/IEC JTC1/SC29/WG11, 4th Meeting: Daegu, KR, Jan. 2011, JCTVC-D273, pp. 1-4

* cited by examiner

FIG. 4B

| Motion vector predictor index | Candidate motion vector predictor |
|---|---|
| 0 | Median(MV_A, MV_B, MV_C) |
| 1 | MV_A |
| 2 | MV_B |
| 3 | MV_C |
| 4 | Temporal motion vector predictor |

FIG. 5

| Motion vector predictor index | Assigned bitstream |
|---|---|
| 0 | 0 |
| 1 | 10 |
| 2 | 110 |
| 3 | 1110 |
| 4 | 1111 |

Data structure of PMT

| Corresponding standard | Driving frequency |
|---|---|
| MPEG-4. AVC | 500 MHz |
| MPEG-2 | 350 MHz |
| ⋮ | ⋮ | ex900

MOVING PICTURE CODING METHOD AND MOVING PICTURE DECODING METHOD

TECHNICAL FIELD

The present invention relates to a moving picture coding method and a moving picture decoding method.

BACKGROUND ART

In coding processing of moving pictures, an amount of information is generally reduced using redundancy of the moving pictures in spatial and temporal directions. Here, a general method using the redundancy in the spatial direction is represented by the transformation into frequency domain while a general method using the redundancy in the temporal direction is represented by inter-picture prediction (hereinafter, referred to as inter prediction) coding process. In the inter prediction coding process, when coding a certain picture, a coded picture located before or after the current picture to be coded in display time order is used as a reference picture. Subsequently, a motion vector of the current picture with respect to the reference picture is derived by motion estimation, and a difference between image data of the current picture and prediction image data resulting from motion compensation based on the motion vector is calculated to remove the redundancy in the temporal direction. Here, in the motion estimation, a difference value between a current block to be coded in the current picture and a block in the reference picture is calculated, and a block having the smallest difference value in the reference picture is determined as a reference block. The motion vector is then estimated using the current block and the reference block.

In the moving picture coding scheme referred to as H. 264, which has already been standardized, three types of pictures: I-picture; P-picture; and B-picture, are used to reduce the amount of information. The I-picture is a picture on which no inter prediction coding process is performed, that is, on which a coding process using intra-picture prediction (hereinafter, referred to as intra prediction) is performed. The P-picture is a picture on which the inter prediction coding is performed with reference to one coded picture located before or after the current picture in display time order. The B-picture is a picture on which the inter prediction coding is performed with reference to two coded pictures located before or after the current picture in display time order.

Furthermore, in the moving picture coding scheme referred to as H. 264, as an inter prediction coding mode for each block in the B picture, there is a motion vector estimation mode in which (i) a difference value between prediction image data and image data of a current block and (ii) a motion vector used for generating the prediction image data are coded. In the motion vector estimation mode, bidirectional prediction or unidirectional prediction can be selected as a prediction direction. In the bidirectional prediction, a prediction image is generated by referring to two coded pictures located before or after the current picture. In the unidirectional prediction, a prediction image is generated by referring to one coded picture located before or after the current picture.

Furthermore, in the moving picture coding scheme referred to as H. 264, a coding mode referred to as a temporal motion vector predictor mode can be selected to derive a motion vector in coding the B-picture. A description is given of an inter prediction coding method in the temporal motion vector predictor mode, referring to FIG. 1. FIG. 1 is a schematic diagram showing motion vectors in the temporal motion vector predictor mode, and illustrates a case where a block "a" of a picture B2 is coded in the temporal motion vector predictor mode. In this case, a motion vector "a" is used which has been used to code a block "b", co-located with the block "a", in a picture P3 serving as a reference picture located after the picture B2. The motion vector "a" is a motion vector which has been used to code the block "b" and refers to a picture P1. The block "a" is coded using bidirectional prediction with reference to reference blocks which are obtained, using motion vectors parallel to the motion vector "a", from the picture P1 serving as a forward reference picture and the picture P3 serving as a backward reference picture. More specifically, the motion vectors used in coding the block "a" are the motion vector "b" for the picture P1 and a motion vector "c" for the picture P3.

CITATION LIST

Non Patent Literature

[NPL 1]
ITU-T Recommendation H.264 "Advanced video coding for generic audiovisual services", March 2010

SUMMARY OF INVENTION

Technical Problem

However, in the conventional temporal motion vector predictor mode, it is necessary to store motion vectors to be used for calculating a temporal motion vector predictor into a memory in advance. For example, when all blocks in the reference picture P3 in FIG. 1 are coded by using bidirectional prediction, each coded block includes at least two motion vectors. Hence, storing all the motion vectors of the reference pictures for calculating a temporal motion vector predictor requires a high-capacity memory and a greater memory bandwidth.

In view of this, the present invention has an object to provide a moving picture coding method and a moving picture decoding method which allow a reduction in necessary memory capacity and necessary bandwidth in the temporal motion vector predictor mode, by using new criteria for appropriately controlling motion vector information to be stored in the memory.

Solution to Problem

In order to achieve the object, the moving picture coding method according to the present invention is a moving picture coding method of coding a current block included in a current picture using a reference motion vector of a reference block included in a reference picture different from the current picture, the reference block being co-located, in the reference picture, with the current block in the current picture. The moving picture coding method includes: determining a value of a predetermined flag which indicates whether or not reference block information is to be read from a memory, the reference block information including, among reference motion vectors of the reference block in a first prediction direction and a second prediction direction, the reference motion vector in the first prediction direction; reading, from the memory, the reference block information including the reference motion vector according to the value of the predetermined flag; coding a motion vector of the current block using the read reference block information; writing, to the memory, the reference block information including the motion vector of the current block according to the value of the predetermined flag; and adding the predetermined flag to a bitstream.

Furthermore, it may be that the memory includes a first storage area for storing the reference block information of the first prediction direction, and a second storage area for storing the reference block information of the second prediction direction, and in the reading, when the predetermined flag indicates ON, the reference block information including the reference motion vector is read from the first storage area, and when the predetermined flag indicates OFF, the reference block information including the reference motion vector is read from the first storage area and the second storage area.

Furthermore, it may be that the memory includes a first storage area for storing the reference block information of the first prediction direction, and a second storage area for storing the reference block information of the second prediction direction, and in the writing, when the predetermined flag indicates ON, and (i) when the current block includes at least one reference motion vector in the first prediction direction, the reference block information including the reference motion vector in the first prediction direction is written to the first storage area, and (ii) when the current block includes only the reference motion vector in the second prediction direction, the reference block information including the reference motion vector in the second prediction direction is written to the first storage area.

Furthermore, it may be that the memory includes a first storage area for storing the reference block information of the first prediction direction, and a second storage area for storing the reference block information of the second prediction direction, and in the writing, when the predetermined flag indicates OFF, and (i) when the current block includes the reference motion vector in the first prediction direction, the reference block information including the reference motion vector in the first prediction direction is written to the first storage area, and (ii) when the current block includes the reference motion vector in the second prediction direction, the reference block information including the reference motion vector in the second prediction direction is written to the second storage area.

Furthermore, it may be that when the reference block includes two or more reference motion vectors, the coding includes: selecting one of the two or more reference motion vectors based on whether the reference picture is located before or after the current picture; and coding the motion vector of the current block using the selected reference motion vector.

Furthermore, it may be that in the selecting, when the reference block includes a forward reference motion vector and a backward reference motion vector, and (i) when the current block is located before the reference block, the forward reference motion vector is selected from the forward reference motion vector and the backward reference motion vector, and (ii) when the current block is located after the reference block, the backward reference motion vector is selected from the forward reference motion vector and the backward reference motion vector.

Furthermore, it may be that in the selecting, when the reference block includes one of a forward reference motion vector and a backward reference motion vector, the one of the forward reference motion vector and the backward reference motion vector in the reference block is selected regardless of a positional relation between the reference block and the current block.

Furthermore, the moving picture decoding method according to the present invention is a moving picture decoding method of decoding a current block included in a current picture using a reference motion vector of a reference block included in a reference picture different from the current picture, the reference block being co-located, in the reference picture, with the current block in the current picture. The moving picture decoding method includes: decoding a value of a predetermined flag which indicates whether or not reference block information is to be read from a memory, the reference block information including, among reference motion vectors of the reference block in a first prediction direction and a second prediction direction, the reference motion vector in the first prediction direction; reading, from the memory, the reference block information including the reference motion vector according to the value of the predetermined flag; decoding a motion vector of the current block using the read reference block information; and writing, to the memory, the reference block information including the motion vector of the current block according to the value of the predetermined flag.

Furthermore, it may be that the memory includes a first storage area for storing the reference block information of the first prediction direction, and a second storage area for storing the reference block information of the second prediction direction, and in the reading, when the predetermined flag indicates ON, the reference block information including the reference motion vector is read from the first storage area, and when the predetermined flag indicates OFF, the reference block information including the reference motion vector is read from the first storage area and the second storage area.

Furthermore, it may be that the memory includes a first storage area for storing the reference block information of the first prediction direction, and a second storage area for storing the reference block information of the second prediction direction, and in the writing, when the predetermined flag indicates ON, and (i) when the current block includes at least one reference motion vector in the first prediction direction, the reference block information including the reference motion vector in the first prediction direction is written to the first storage area, and (ii) when the current block includes only the reference motion vector in the second prediction direction, the reference block information including the reference motion vector in the second prediction direction is written to the first storage area.

Furthermore, it may be that the memory includes a first storage area for storing the reference block information of the first prediction direction, and a second storage area for storing the reference block information of the second prediction direction, and in the writing, when the predetermined flag indicates OFF, and (i) when the current block includes the reference motion vector in the first prediction direction, the reference block information including the reference motion vector in the first prediction direction is written to the first storage area, and (ii) when the current block includes the reference motion vector in the second prediction direction, the reference block information including the reference motion vector in the second prediction direction is written to the second storage area.

Furthermore, it may be that when the reference block includes two or more reference motion vectors, the decoding includes: selecting one of the reference motion vectors based on whether the reference picture is located before or after the current picture; and decoding the motion vector of the current block using the selected reference motion vector.

Furthermore, it may be that in the selecting, when the reference block includes a forward reference motion vector and a backward reference motion vector, and (i) when the current block is located before the reference block, the forward reference motion vector is selected from the forward reference motion vector and the backward reference motion vector, and (ii) when the current block is located after the reference block, the backward reference motion vector is selected from the forward reference motion vector and the backward reference motion vector.

Furthermore, it may be that in the selecting, when the reference block includes one of a forward reference motion vector and a backward reference motion vector, the one of the forward reference motion vector and the backward reference motion vector in the reference block is selected regardless of a positional relation between the reference block and the current block.

It is to be noted that the present invention can be realized not only as the moving picture coding method and the moving picture decoding method but also as a moving picture coding apparatus and a moving picture decoding apparatus having, as units, the characteristics steps included in the moving picture coding method and the moving picture decoding method. The present invention can be also realized as a program causing a computer to execute the steps. Such a program can be realized as a computer-readable recording medium such as a CD-ROM or as information, data, or a signal indicating the program. The program, the information, the data, or the signal may be distributed via a communication network such as the Internet.

Advantageous Effects of Invention

According to the present invention, it is possible to reduce necessary memory capacity and necessary bandwidth in the temporal motion vector predictor mode by using new criteria for appropriately controlling motion vector information to be stored in the memory in the temporal motion vector predictor mode.

BRIEF DESCRIPTION OF DRAWINGS

FIG. 4B is a table showing an example of a method of assigning a motion vector predictor index.

FIG. 5 shows an example of a table used in performing variable-length coding on a motion vector predictor index.

DESCRIPTION OF EMBODIMENTS

Embodiments of the present invention are described in detail below with reference to the drawings.

Embodiment 1

Figure 1:
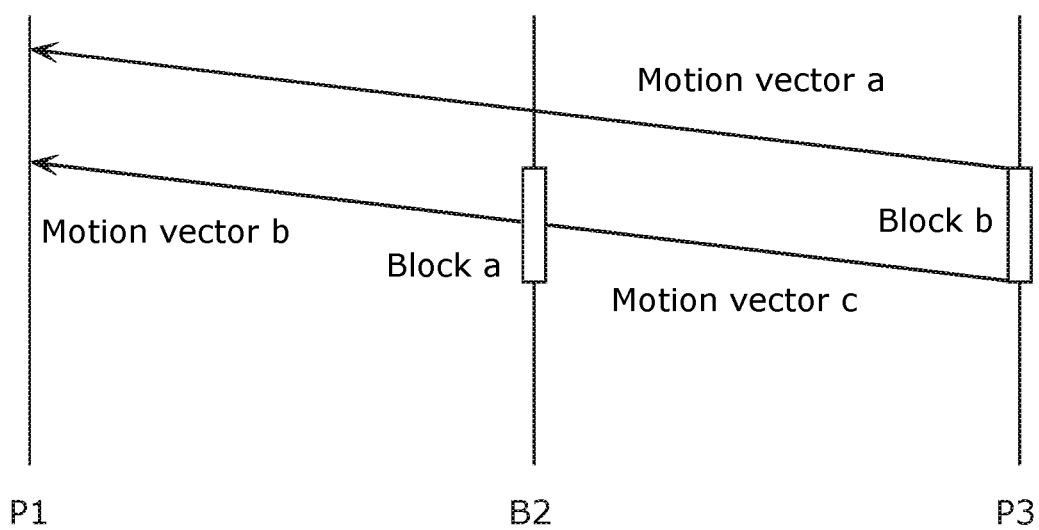
FIG. 1 is a schematic diagram showing motion vectors in temporal direct.
Figure 2:
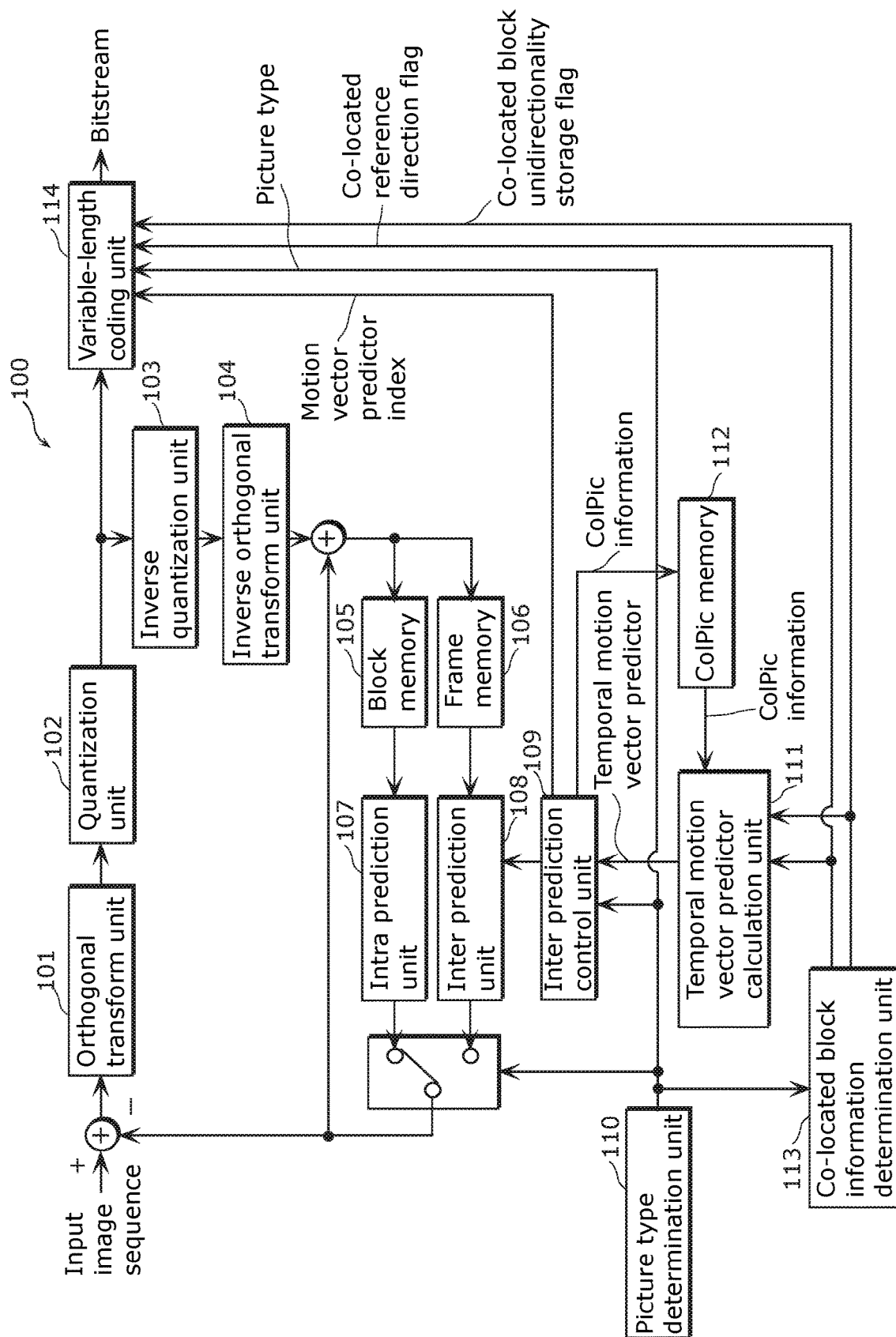
FIG. 2 is a block diagram showing a configuration of one embodiment of a moving picture coding apparatus using a moving picture coding method according to the present invention.

FIG. 2 is a block diagram showing a configuration of one embodiment of a moving picture coding apparatus using a moving picture coding method according to the present invention.

As shown in FIG. 2, a moving picture coding apparatus 100 includes an orthogonal transform unit 101, a quantization unit 102, an inverse quantization unit 103, an inverse orthogonal transform unit 104, a block memory 105, a frame memory 106, an intra prediction unit 107, an inter prediction unit 108, an inter prediction control unit 109, a picture type determination unit 110, a temporal motion vector predictor calculation unit 111, a colPic memory 112, a co-located block information determination unit 113, and a variable-length coding unit 114.

The orthogonal transform unit 101 transforms an input image sequence from image domain into frequency domain. The quantization unit 102 performs a quantization process on the input image sequence transformed into the frequency domain. The inverse quantization unit 103 performs an inverse quantization process on the input image sequence on which the quantization unit 102 has performed the quantization process. The inverse orthogonal transform unit 104 transforms, from frequency domain into image domain, the input image sequence on which the inverse quantization process has been performed. The block memory 105 stores the input image sequence in units of blocks. The frame memory 106 stores the input image sequence in units of frames. The picture type determination unit 110 determines which one of the picture types, I-picture, B-picture, and P-picture, is used to code the input image sequence, and generates picture type information. The intra prediction unit 107 codes, by intra prediction, the current block using the input image sequence stored in units of blocks in the block memory 105, to generate prediction image data. The inter prediction unit 108 codes, by inter prediction, the current block using the input image stored in units of frames in the frame memory 106 and a motion vector derived by motion estimation, to generate prediction image data.

The co-located block information determination unit 113 determines which one of a block included in a picture located before the current picture in display time order (hereinafter, referred to as a forward reference block) and a block included in a picture located after the current picture in display time order (hereinafter, referred to as a backward reference block) will be a co-located block. The co-located block information determination unit 113 generates a co-located reference direction flag for each picture according to one of the forward reference block and the backward reference block determined to be the co-located block, and adds the co-located reference direction flag to the current picture. The co-located block information determination unit 113 also determines whether or not only unidirectional motion vector out of the motion vectors of the co-located block is to be stored in the colPic memory. The co-located block information determination unit 113 generates, for each picture, a co-located block unidirectionality storage flag indicating whether or not the unidirectional motion vector is to be stored in the colPic memory, and adds the co-located block unidirectionality storage flag to the current picture. Here, the co-located block indicates a block which is included in a picture different from a picture including the current block and whose position in the picture is the same as that of the current block.

The temporal motion vector predictor calculation unit 111 derives a candidate motion vector predictor (a temporal motion vector predictor) in the temporal motion vector predictor mode, using colPic information such as a motion vector of the co-located block stored in the colPic memory 112. The temporal motion vector predictor calculation unit 111 also assigns a motion vector predictor index value corresponding to the temporal motion vector predictor. The temporal motion vector predictor calculation unit 111 transmits the temporal motion vector predictor and the motion vector predictor index to the inter prediction control unit 109. When the co-located block includes no motion vector, the temporal motion vector predictor calculation unit 111 stops the derivation of a motion vector in the temporal motion vector predictor mode, or derives a candidate motion vector predictor (a temporal motion vector predictor) assuming that the motion vector is 0.

The inter prediction control unit 109 determines to code the motion vector using, among candidate motion vector predictors, a candidate motion vector predictor having the least error from the motion vector derived by the motion estimation. Here, an error indicates a difference value between each of the candidate motion vector predictors and the motion vector derived by the motion estimation. Moreover, the inter prediction control unit 109 generates, for each block, a motion vector predictor index corresponding to the motion vector predictor for which the determination is made. Furthermore, the inter prediction control unit 109 transmits, to the variable-length coding unit 114, the motion vector predictor index and error information indicating the error between the candidate motion vector predictor and the motion vector. Furthermore, the inter prediction control unit 109 transfers, to the colPic memory 112, colPic information including the motion vector of the current block and others.

The orthogonal transform unit 101 transforms, from image domain into frequency domain, prediction error data between generated prediction image data and the input image sequence. The quantization unit 102 performs a quantization process on the prediction error data transformed into the frequency domain. The variable-length coding unit 114 generates a bitstream by performing a variable-length coding process on the prediction error data on which the quantization process has been performed, the motion vector predictor index, error information on the candidate motion vector predictor, the picture type information, the co-located reference direction flag, and the co-located block unidirectionality storage flag.

Figure 3:
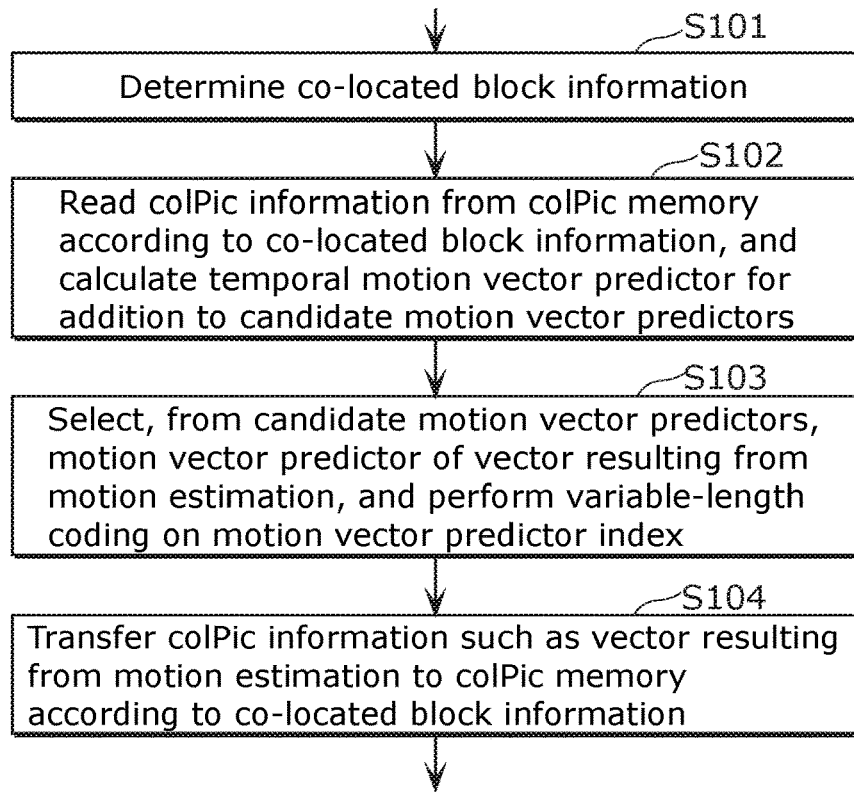
FIG. 3 shows an outline of a process flow of the moving picture coding method according to the present invention.

FIG. 3 shows an outline of a process flow of the moving picture coding method according to the present invention. The co-located block information determination unit 113 determines co-located block information, such as the co-located reference direction flag and the co-located block unidirectionality storage flag, by a method that will be described later, when deriving a candidate motion vector predictor in the temporal motion vector predictor mode (Step S101). The temporal motion vector predictor calculation unit 111 reads, from the colPic memory, colPic information including a reference motion vector of a co-located block and others according to the co-located block information, and derives a candidate motion vector predictor (a temporal motion vector predictor) in the temporal motion vector predictor mode using the reference motion vector of the co-located block (Step S102). Furthermore, the temporal motion vector predictor calculation unit 111 assigns a motion vector predictor index value corresponding to the temporal motion vector predictor. In general, when the motion vector predictor index indicates a smaller value, a required amount of information decreases. In contrast, when the value increases, a required amount of information increases. Thus, decreasing the value of the motion vector predictor index increases coding efficiency. Here, the motion vector predictor index corresponds to a motion vector that is likely to be a motion vector with high accuracy. The inter prediction control unit 109 codes a picture by inter prediction using the motion vector derived by the motion estimation (Step S103). Moreover, the inter prediction control unit 109 codes the motion vector using, among candidate motion vector predictors, a motion vector predictor having the least error. For example, it is determined that, assuming that a difference value between each of the candidate motion vector predictors and the motion vector derived by the motion estimation is an error, the candidate motion vector predictor having the least error is used in coding the motion vector. Then, the inter prediction control unit 109 outputs, to the variable-length coding unit 114, a motion vector predictor index corresponding to the determined candidate motion vector predictor and error information on the determined motion vector predictor for performing variable-length coding. Next, the inter prediction control unit 109 transfers, by using a method to be described later, colPic information including the motion vector used for inter prediction and others to the colPic memory 112 for storage (Step S104). The colPic memory 112 stores motion vectors and index values of reference pictures, prediction direction and others for calculating a temporal motion vector predictor for a current block.

Figure 4A:
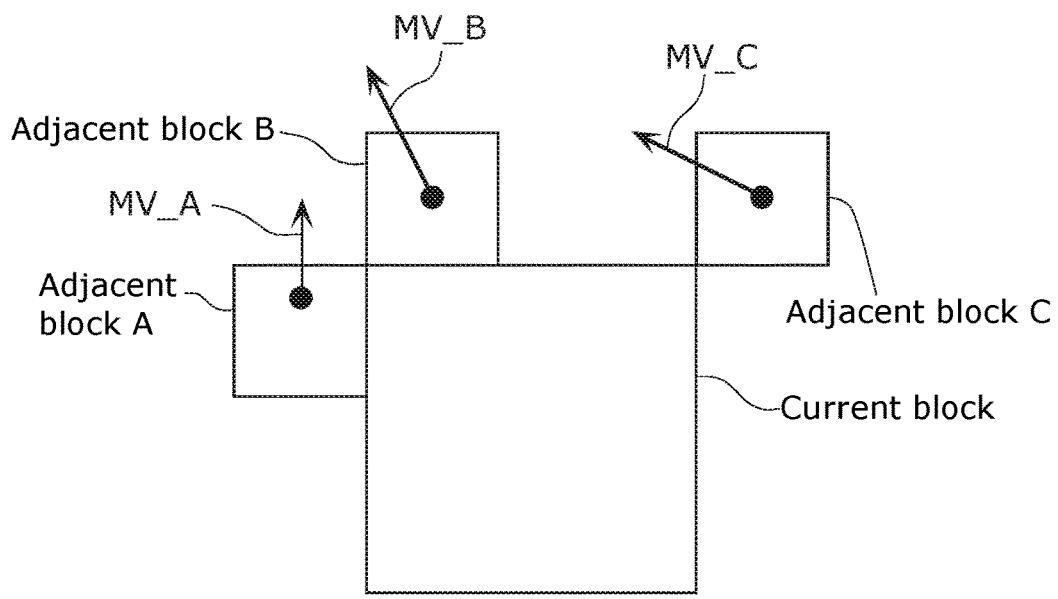
FIG. 4A is a diagram showing an example of candidate motion vector predictors.

FIG. 4A is a diagram showing an example of candidate motion vector predictors. A motion vector A (MV_A) is a motion vector of an adjacent block A located to the left of a current block. A motion vector B (MV_B) is a motion vector of an adjacent block B located on top of the current block. A motion vector C (MV_C) is a motion vector of an adjacent block C located to the upper right of the current block. Median (MV_A, MV_B, MV_C) indicates a median value among the motion vectors A, B, and C. Here, the median value is calculated by the following (Equation 1) to (Equation 3).

[Math 1]

$$\text{Median}(x, y, z) = \quad \text{(Equation 1)}$$
$$x + y + z - \text{Min}(x, \text{Min}(y, z)) - \text{Max}(x, \text{Max}(y, z))$$

$$\text{Min}(x, y) = \begin{cases} x & (x \le y) \\ y & (x > y) \end{cases} \quad \text{(Equation 2)}$$

$$\text{Max}(x, y) = \begin{cases} x & x \ge y \\ y & (x < y) \end{cases} \quad \text{(Equation 3)}$$

FIG. 4B is a table showing an example of a method of assigning a motion vector predictor index. Among values of motion vector predictor indexes, a value corresponding to Median (MV_A, MV_B, MV_C) is 0, a value corresponding to the motion vector A is 1, a value corresponding to MV_B is 2, a value corresponding to MV_C is 3, and a value corresponding to a temporal motion vector predictor is 4. The method of assigning a motion vector predictor index is not limited to this example.

FIG. 5 shows an example of a table used in performing variable-length coding on a motion vector predictor index. A code having a shorter code length is assigned to a motion vector predictor index having a smaller value. As a result, it is possible to increase coding efficiency by decreasing the value of a motion vector predictor index corresponding to a candidate motion vector predictor that is likely to have high prediction accuracy.

Figure 6:
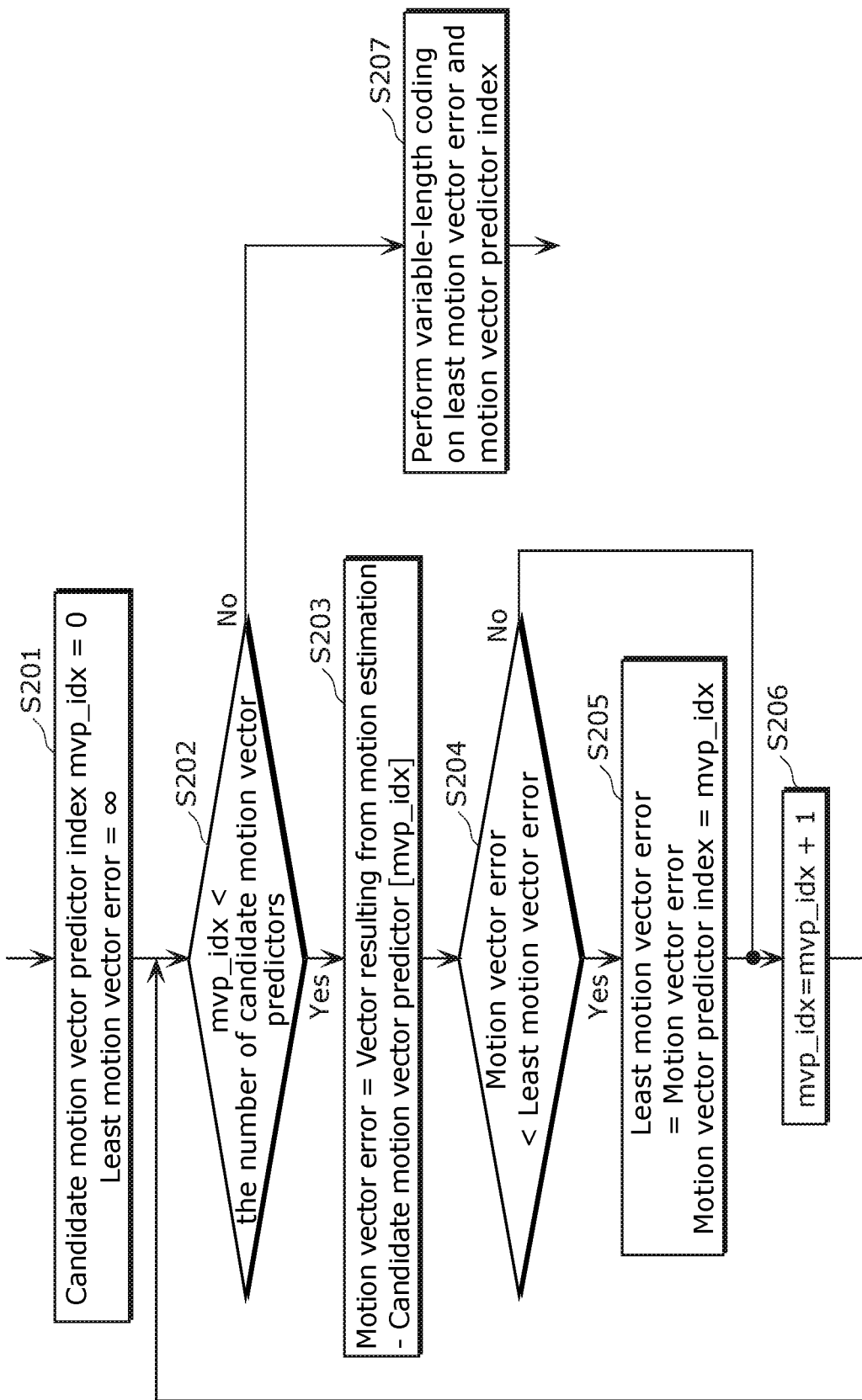
FIG. 6 is a flowchart showing a flow of determining a candidate motion vector predictor in an inter prediction control unit according to Embodiment 1.

FIG. 6 is a flowchart for determining a candidate motion vector predictor in the inter prediction control unit 109.

The inter prediction control unit 109 determines that a candidate motion vector predictor index mvp_idx is 0 and the least motion vector error is ∞ (Step S201). The inter prediction control unit 109 determines whether or not the candidate motion vector predictor index mvp_idx is smaller than the number of candidate motion vector predictors (Step S202). When the inter prediction control unit 109 determines that the candidate motion vector predictor index mvp_idx is smaller than the number of candidate motion vector predictors (Yes in Step S202), the inter prediction control unit 109 calculates a motion vector error from a difference between the motion vector derived by the motion estimation and the candidate motion vector predictor (Step S203). Next, the inter prediction control unit 109 determines whether or not the calculated motion vector error is smaller than the least motion vector error (Step S204). When the inter prediction control unit 109 determines that the motion vector error is smaller than the least motion vector error (Yes in step S204), the inter prediction control unit 109 determines that the least motion vector error is the calculated motion vector error and the motion vector predictor index is the candidate motion vector predictor index mvp_idx (Step S205). The inter prediction control unit 109 adds the value "1" to the candidate motion vector predictor index mvp_idx (Step S206), and the flow returns to step S202. When the inter prediction control unit 109 determines in step S202 that the candidate motion vector predictor index mvp_idx is not smaller than the number of candidate motion vector predictors (No in step S202), the inter prediction control unit 109 outputs the least motion vector error and the motion vector predictor index to the variable-length coding unit 114 for performing variable-length coding (Step S207). As described above, according to the flow shown in FIG. 6, the candidate motion vector predictor having the least error from the motion vector derived by the motion estimation is determined to be used in coding the motion vector. Then, error information on the determined candidate motion vector predictor and the motion vector predictor index indicating the determined motion vector predictor are output to the variable-length coding unit 114 for variable-length coding.

Figure 7:
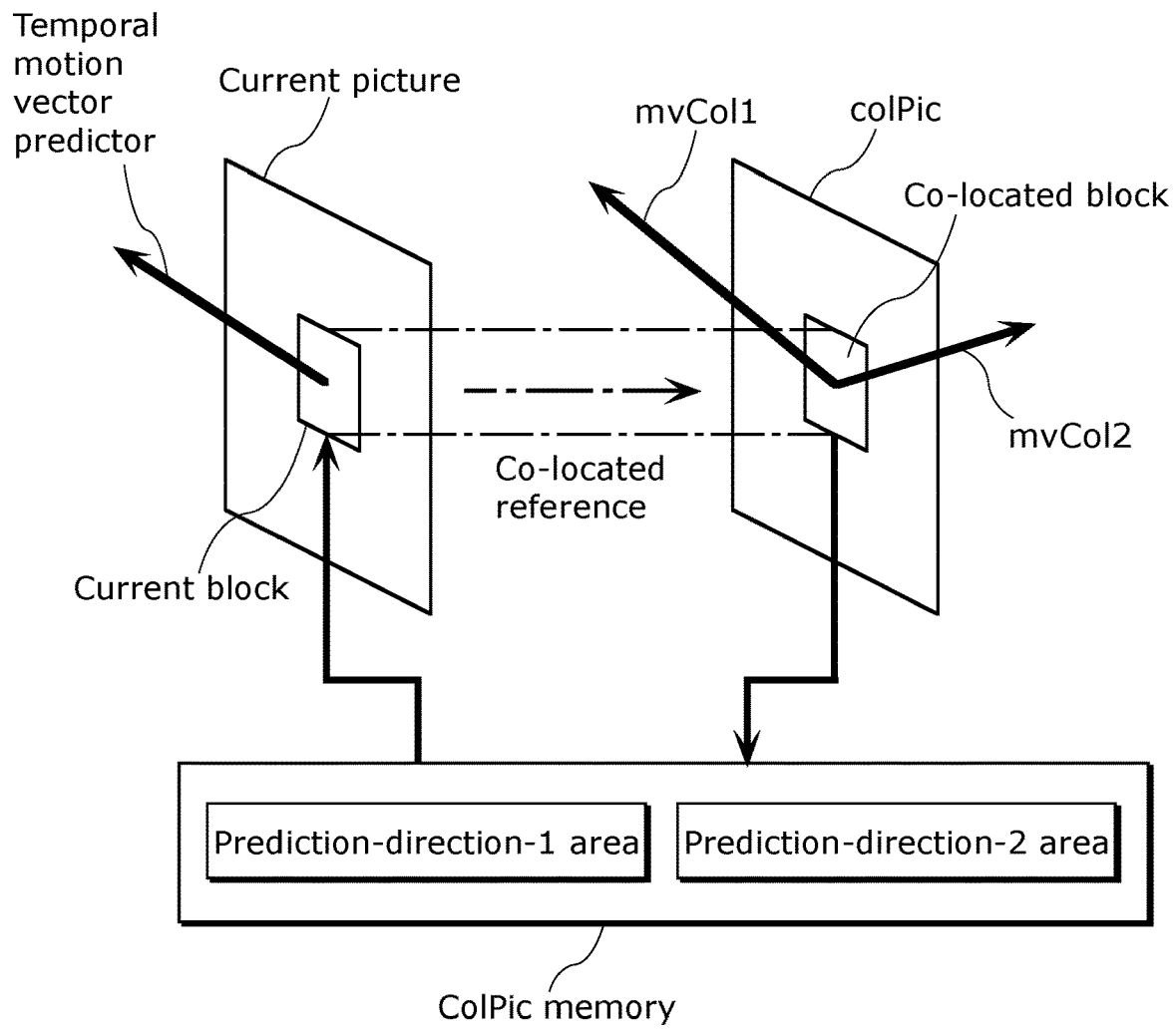
FIG. 7 is a conceptual diagram of processing for reading and writing from and to a colPic memory.

FIG. 7 is a conceptual diagram of processing for reading and writing from and to the colPic memory 112 shown in FIG. 2. In FIG. 7, the motion vector mvCol1 in prediction direction 1 and the motion vector mvCol2 in prediction direction 2 of the co-located block of the co-located picture colPic are stored in the colPic memory by a method to be described later, according to a co-located block unidirectionality storage flag. In this embodiment, a description is given of an example where the prediction direction 1 is forward reference and the prediction direction 2 is backward reference. However, it may also be that the prediction direction 1 is backward reference, the prediction direction 2 is forward reference, or both of the prediction directions 1 and 2 are one of forward reference and backward reference. Furthermore, the co-located block is a block whose position in the co-located picture colPic corresponds to that of the current block in the current picture. Whether the co-located picture colPic is located after or before the current picture is switched by a co-located reference direction flag. Subsequently, when the current block is coded, colPic information including a motion vector stored in the colPic memory and others is read according to the co-located block unidirectionality storage flag, and a temporal motion vector predictor is calculated. The calculated temporal motion vector predictor is used for coding the current block.

The colPic memory includes an area for prediction direction 1 (hereinafter, referred to as prediction-direction-1 area) and an area for prediction direction 2 (hereinafter, referred to as prediction-direction-2 area). According to the co-located block unidirectionality storage flag, colPic information including a motion vector in prediction direction 1 and others, and colPic information including a motion vector in prediction direction 2 and others are stored in the corresponding areas. In this embodiment, the colPic memory includes the prediction-direction-1 area and the prediction-direction-2 area. However, in the case where the co-located block unidirectionality storage flag always indicates ON, only the prediction-direction-1 area may be prepared, leading to a reduction in the required capacity of the colPic memory.

Figure 8:
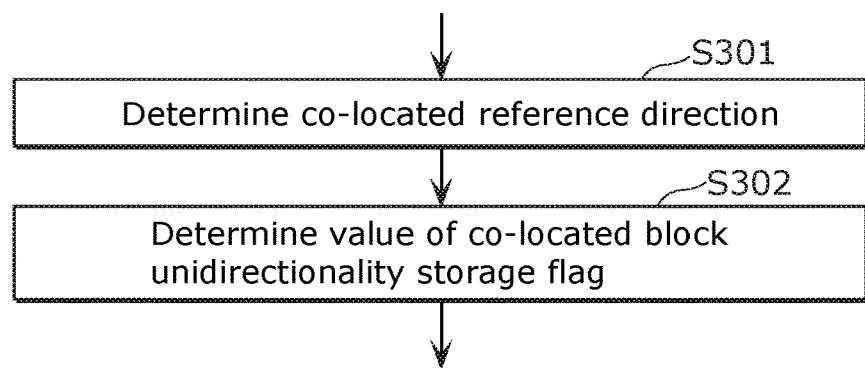
FIG. 8 is a flowchart showing a detailed process flow of step S101 shown in FIG. 3.

FIG. 8 is a flowchart showing a detailed process flow of step S101 shown in FIG. 3. A description of FIG. 8 is given below.

The co-located block information determination unit 113 determines which one of the forward reference block and the backward reference block will be the co-located block (Step S301). For example, of the forward reference picture which includes the forward reference block and the backward reference picture which includes the backward reference block, the co-located block information determination unit 113 may determine the reference picture closer to the current picture in the display order, as the reference direction of the co-located block. Subsequently, the co-located block information determination unit 113 generates, for each picture, the co-located reference direction flag indicating whether the co-located block is the forward reference block or the backward reference block, and adds the generated co-located reference direction flag to the picture. Next, the co-located block information determination unit 113 determines whether or not colPic information such as a motion vector to be stored in the colPic memory is to be for the unidirectional motion vector (Step S302). For example, in the case where the memory bandwidth is decreased or the capacity of the coPic memory is decreased to suppress delay, the colPic information such as a motion vector to be stored in the colPic memory may be limited to the unidirectional motion vector. The co-located block information determination unit 113 then generates, for each picture, a co-located block unidirectionality storage flag indicating that the colPic information including, for example, a motion vector to be stored in the colPic memory is limited to the unidirectional motion vector, and adds the generated flag to the picture.

Figure 9:
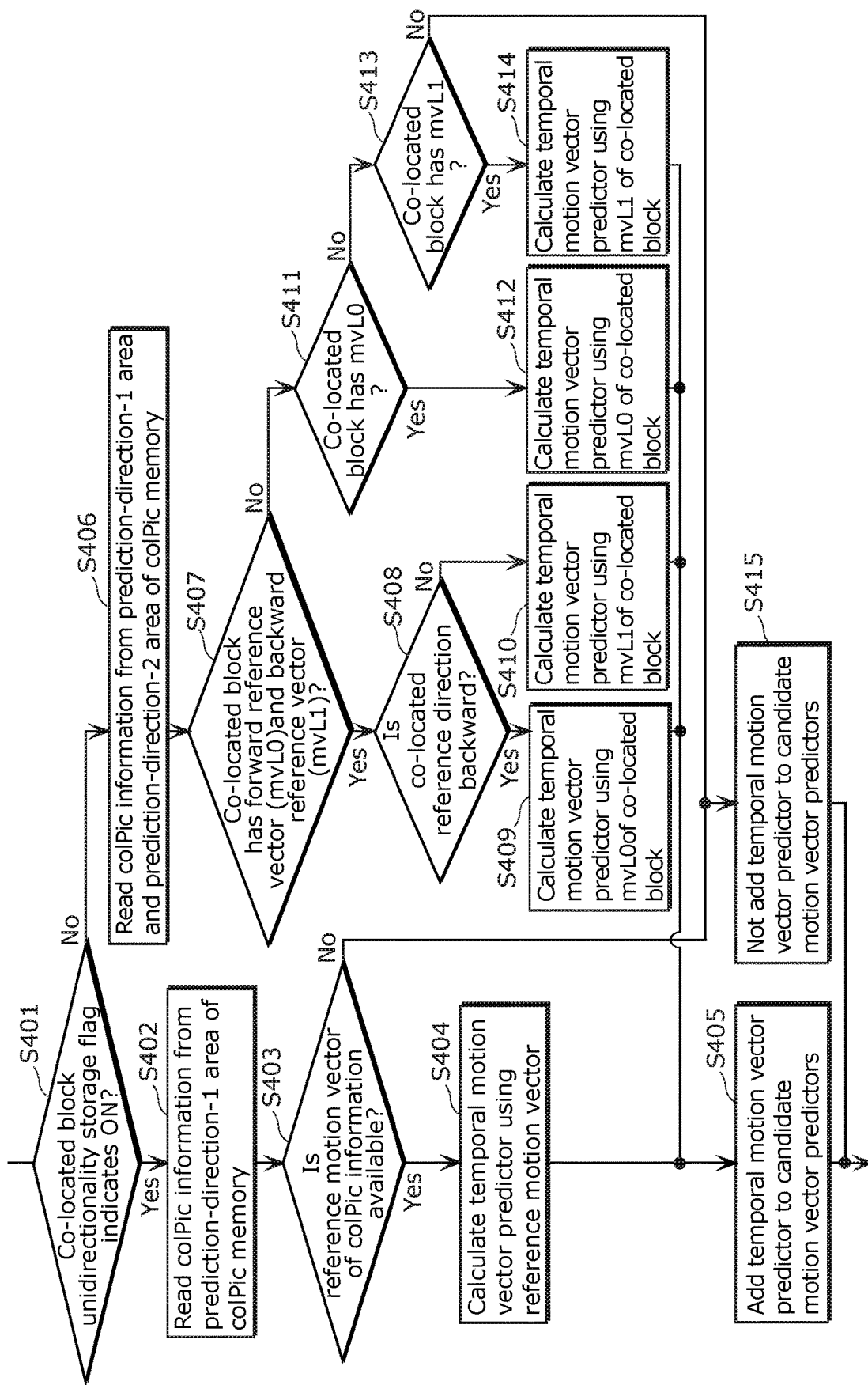
FIG. 9 is a flowchart showing a detailed process flow of step S102 shown in FIG. 3.

FIG. 9 is a flowchart showing a detailed process flow of step S102 shown in FIG. 3. A description of FIG. 9 is given below.

The temporal motion vector predictor calculation unit 111 determines whether or not the co-located block unidirectionality storage flag indicates ON (Step S401). When the determination shows that the co-located block unidirectionality storage flag indicates ON (Yes in Step S401), the temporal motion vector predictor calculation unit 111 reads, from the prediction-direction-1 area of the colPic memory, colPic information including a reference motion vector and the like (Step S402). Next, the temporal motion vector predictor calculation unit 111 determines whether or not the reference motion vector included in the colPic information read from the colPic memory is available (Step S403). Here, the reference motion vector being available means that a reference motion vector for calculating the temporal motion vector predictor is present. When the co-located block is intra coded, it is determined that the reference motion vector is not available. Here, when the reference motion vector is available (Yes in Step S403), the temporal motion vector predictor calculation unit 111 calculates a temporal motion vector predictor using the reference motion vector (Step S404). The temporal motion vector predictor calculation unit 111 then adds the calculated temporal motion vector predictor to candidate motion vector predictors (Step S404). On the other hand, when the reference motion vector is not available (No in Step S403), the temporal motion vector predictor calculation unit 111 does not add the temporal motion vector predictor to candidate motion vector predictors, or adds, to the candidate motion vector predictors, the temporal motion vector predictor of the co-located block assuming that the temporal motion vector predictor is 0 (Step S415).

Furthermore, when the determination in Step S401 shows that the co-located block unidirectionality storage flag indicates OFF (No in Step S401), the temporal motion vector predictor calculation unit 111 reads, from the prediction-direction-1 area and the prediction-direction-2 area of the colPic memory, colPic information including a reference motion vector in the prediction direction 1, a reference motion vector in the prediction direction 2, and others (Step S406). Next, the temporal motion vector predictor calculation unit 111 determines whether the co-located block in the colPic information has two or more motion vectors, that is, has at least the forward reference motion vector (mvL0) and the backward reference motion vector (mvL1) (Step S407). When it is determined that the co-located block has two or more motion vectors (Yes in Step S407), the temporal motion vector predictor calculation unit 111 determines whether or not the co-located block is the backward reference block (Step S408). Here, when it is determined that the co-located block is the backward reference block (Yes in Step S408), the temporal motion vector predictor calculation unit 111 derives a temporal motion vector predictor in the temporal motion vector predictor mode using the forward reference motion vector of the co-located block (Step S409). On the other hand, when it is determined that the co-located block is the forward reference block (No in Step S408), the temporal motion vector predictor calculation unit 111 derives a temporal motion vector predictor in the temporal motion vector predictor mode using the backward reference motion vector of the co-located block (Step S410).

Furthermore, when it is determined in Step S407 that the co-located block has only the forward reference motion vector or the backward reference motion vector (No in Step S407), the temporal motion vector predictor calculation unit 111 determines whether or not the co-located block has the forward reference motion vector (Step S411). When it is determined in Step S411 that the co-located block has the forward reference motion vector (Yes in Step S411), the temporal motion vector predictor calculation unit 111 derives a temporal motion vector predictor of the current block using the forward reference motion vector of the co-located block (Step S412). On the other hand, when it is determined in Step S411 that the co-located block has no forward reference motion vector (No in Step S411), the temporal motion vector predictor calculation unit 111 determines whether or not the co-located block has the backward reference motion vector (Step S413). Here, when it is determined in Step S413 that the co-located block has the backward reference motion vector, the temporal motion vector predictor calculation unit 111 derives a temporal motion vector predictor of the current block using the backward reference motion vector (Step S414). On the other hand, when it is determined in Step S413 that the co-located block has no backward reference motion vector (No in Step S413), the temporal motion vector predictor calculation unit 111 does not add the temporal motion vector predictor to candidate motion vector predictors, or adds, to candidate motion vector predictors, the temporal motion vector predictor of the co-located block assuming that the temporal motion vector predictor is 0 (Step S415).

In the process flow of FIG. 9, it is determined in Step S411 whether or not the co-located block has the forward reference motion vector, and it is determined in Step S413 whether or not the co-located block has the backward reference motion vector, but the present invention is not limited to this flow. For example, whether or not the co-located block has the forward reference motion vector may be determined after determining whether or not the co-located block has the backward reference motion vector.

Next, a detailed description is given of a method of deriving a temporal motion vector predictor in the temporal prediction motion vector mode.

Figure 10A:
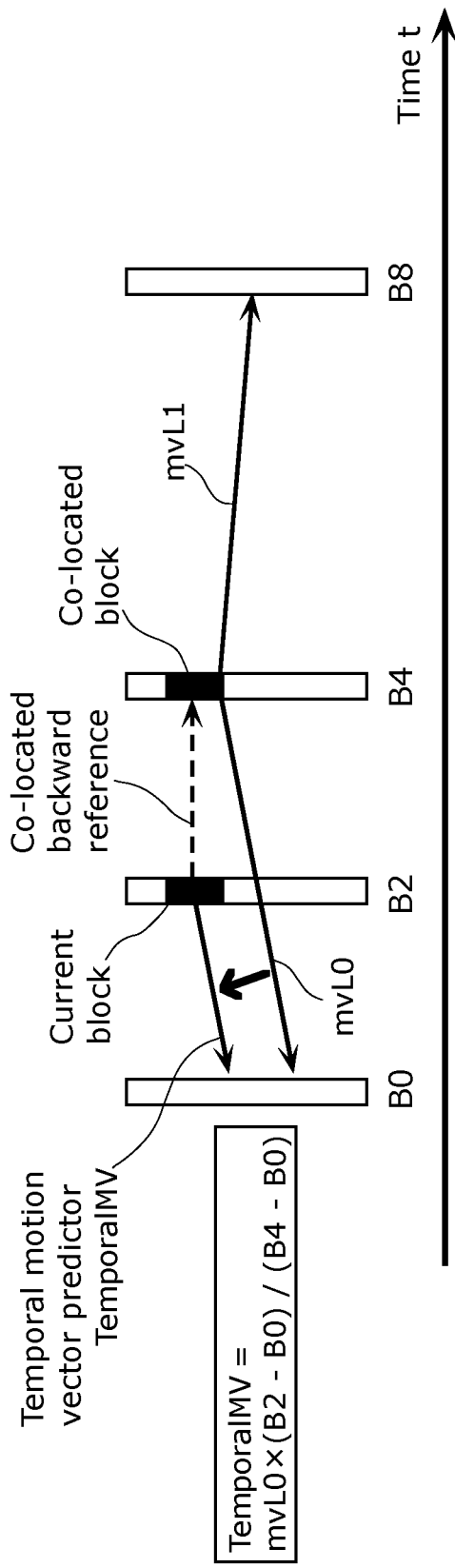
FIG. 10A is a diagram showing an example of a method of deriving a candidate motion vector predictor in a temporal motion vector predictor mode.

FIG. 10A shows a method of deriving a candidate motion vector predictor (a temporal motion vector predictor) in the temporal motion vector predictor mode using the forward reference motion vector, when the co-located block is the backward reference block and has the forward reference motion vector and the backward reference motion vector. Using the forward reference motion vector, a candidate motion vector predictor (TemporalMV) is derived by the following equation:

$$TemporalMV = mvL0 \times (B2-B0)/(B4-B0) \quad \text{(Equation 4)}$$

Here, (B2–B0) represents information on a time difference in display time between a picture B2 and a picture B0, and (B4–B0) represents information on a time difference in display time between a picture B4 and the picture B0.

Figure 10B:
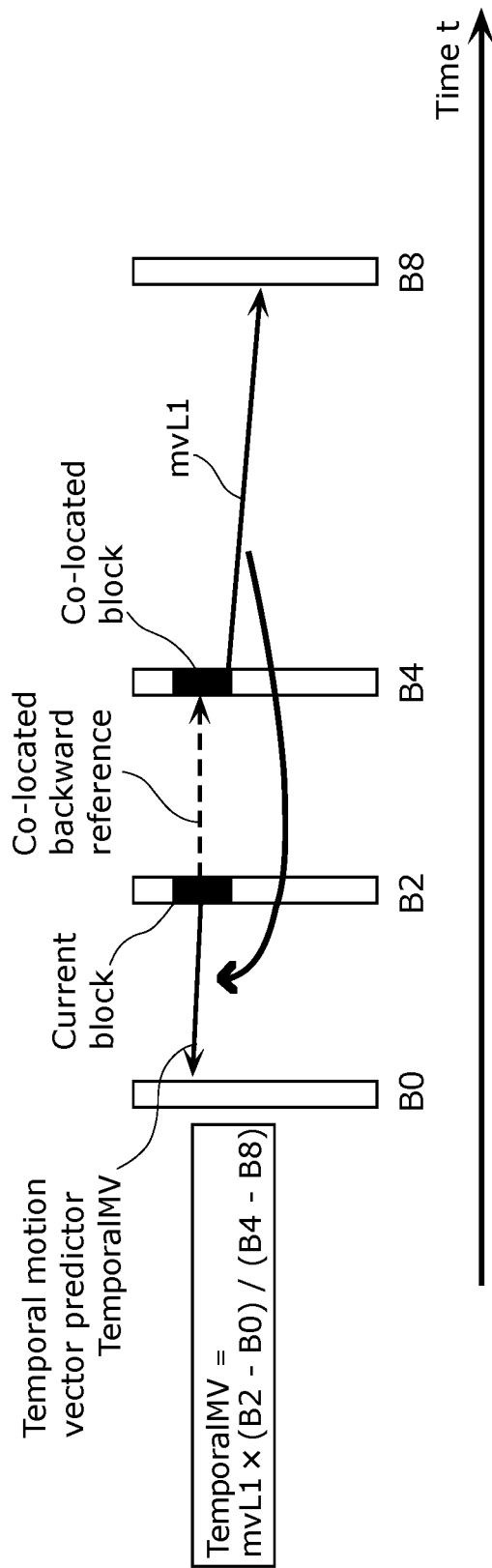
FIG. 10B is a diagram showing another example of a method of deriving a candidate motion vector predictor in the temporal motion vector predictor mode.

FIG. 10B shows the method of deriving a candidate motion vector predictor (a temporal motion vector predictor) in the temporal motion vector predictor mode using the backward reference motion vector. Using the backward reference motion vector, the candidate motion vector predictor is derived by the following equation:

$$TemporalMV = mvL1 \times (B2-B0)/(B4-B8) \quad \text{(Equation 5)}$$

Figure 11A:
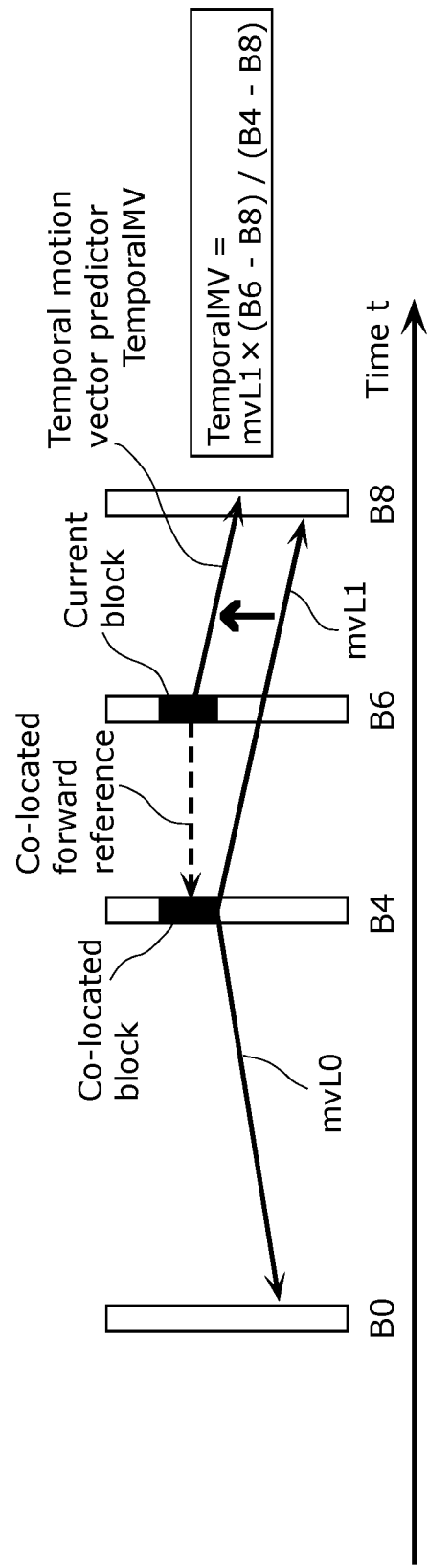
FIG. 11A is a diagram showing another example of a method of deriving a candidate motion vector predictor in the temporal motion vector predictor mode.

FIG. 11A shows the method of deriving a candidate motion vector predictor (a temporal motion vector predictor) in the temporal motion vector predictor mode using the backward reference motion vector when the co-located block is the forward reference block and has the forward reference motion vector and the backward reference motion vector. Using the backward reference motion vector, the candidate motion vector predictor is derived by the following equation:

$$TemporalMV = mvL1 \times (B6-B8)/(B4-B8) \quad \text{(Equation 6)}$$

Figure 11B:
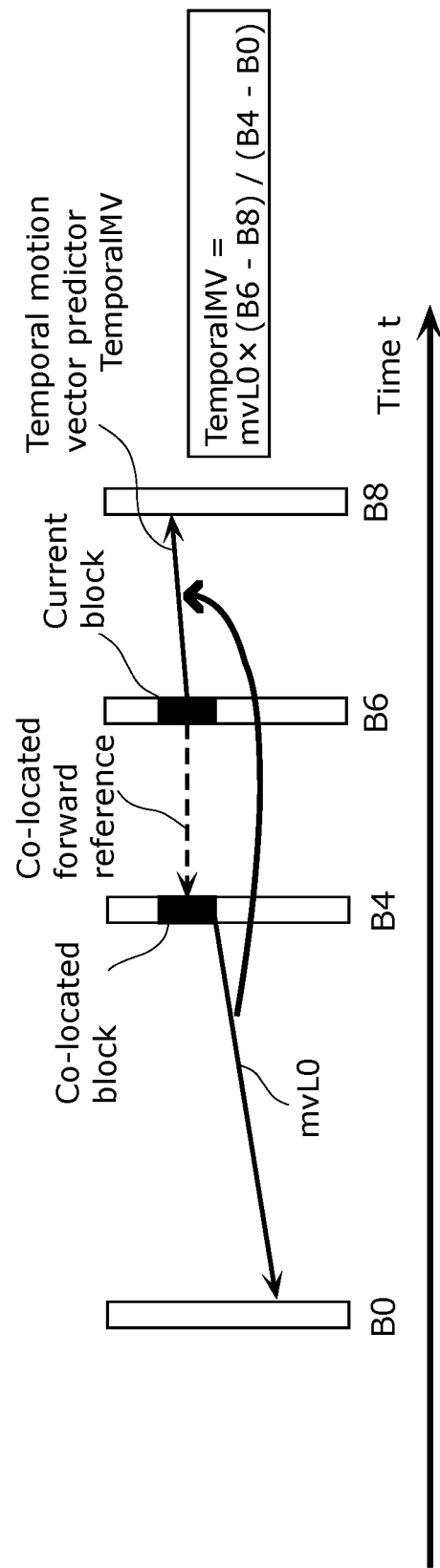
FIG. 11B is a diagram showing another example of a method of deriving a candidate motion vector predictor in the temporal motion vector predictor mode.

FIG. 11B shows the method of deriving a candidate motion vector predictor (a temporal motion vector predictor) in the temporal motion vector predictor mode using the forward reference motion vector. Using the backward reference motion vector, the candidate motion vector predictor is derived by the following equation:

$$TemporalMV = mvL0 \times (B6-B8)/(B4-B0) \quad \text{(Equation 7)}$$

Figure 12:
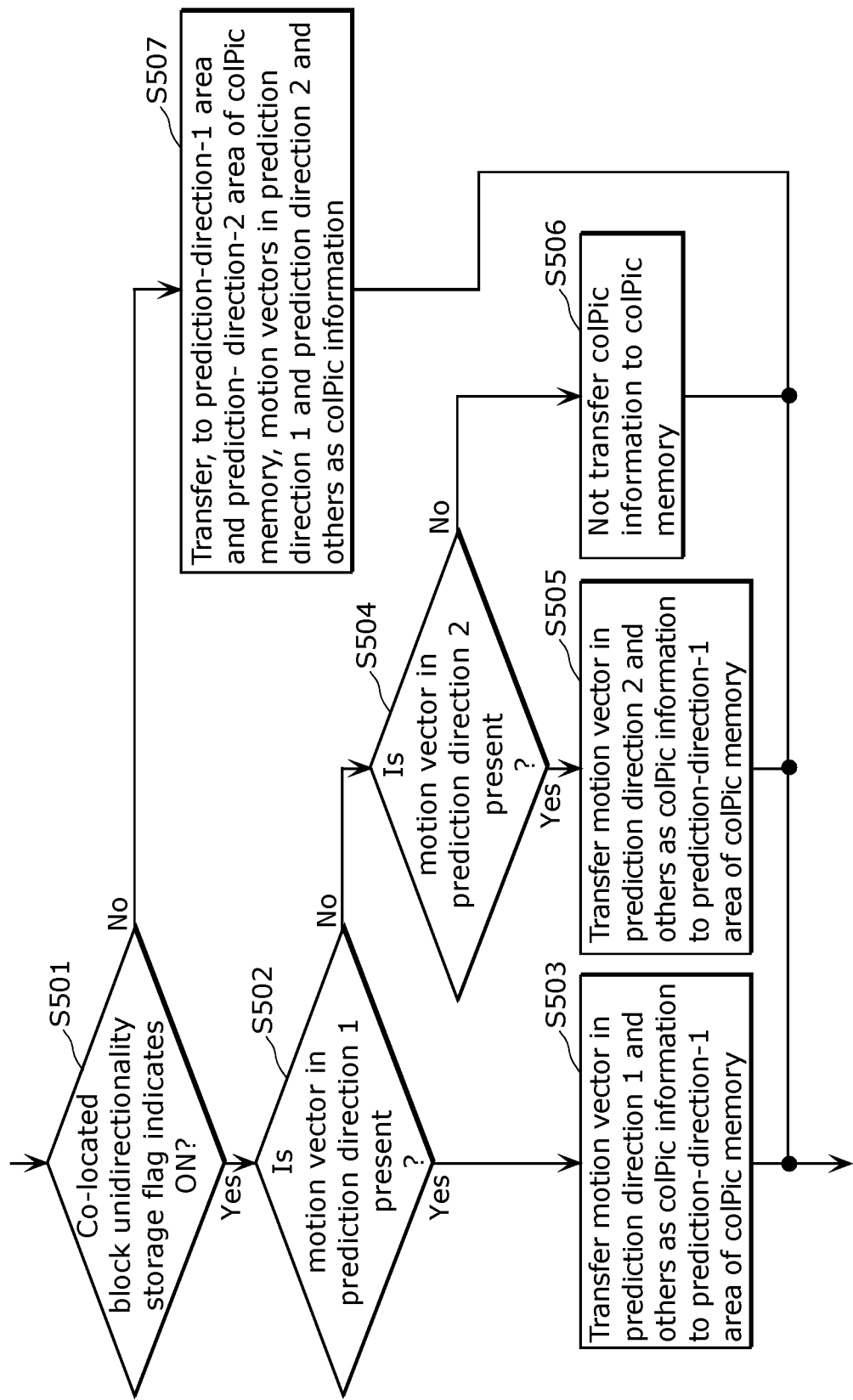
FIG. 12 is a flowchart showing a detailed process flow of step S104 shown in FIG. 3.

FIG. 12 is a flowchart showing a detailed process flow of step S104 shown in FIG. 3. A description of FIG. 12 is given below.

The inter prediction control unit 109 determines whether or not the co-located block unidirectionality storage flag indicates ON (Step S501). When it is determined that the co-located block unidirectionality storage flag indicates ON (Yes in Step S501), the inter prediction control unit 109 determines whether or not the motion vector (vectors) used for inter prediction of the current block includes the motion vector in the prediction direction 1 (Step S502). More specifically, the inter prediction control unit 109 determines whether the current block has been inter coded in the prediction direction 1 or bidirectional prediction. Here, when the motion vector used for the inter prediction includes the motion vector in the prediction direction 1 (Yes in Step S502), the inter prediction control unit 109 transfers, as colPic information, information including, for example, the motion vector in the prediction direction 1 to the prediction-direction-1 area of the colPic memory, and store the information (Step S503). On other hand, when the motion vector used for the inter prediction does not include the motion vector in the prediction direction 1 (No in Step S502), the inter prediction control unit 109 determines whether or not the motion vector used for the inter prediction of the current block includes the motion vector in the prediction direction 2 (Step S504). More specifically, the inter prediction control unit 109 determines whether the current block has been inter coded in the prediction direction 2. When it is determined that the motion vector used for the inter prediction includes the motion vector in the prediction direction 2 (Yes in Step S504), the inter prediction control unit 109 transfers, as colPic information, information including the motion vector in the prediction direction 2 and others to the prediction-direction 1 area of the colPic memory, and store the information (Step S505). On the other hand, when the motion vector used for the inter prediction does not include the motion vector in the prediction direction 2 (No in Step S504), the inter prediction control unit 109 does not transfer the colPic information to the colPic memory (Step S506).

When it is determined in Step S501 that the co-located block unidirectionality storage flag indicates OFF (No in Step S501), the inter prediction control unit 109 transfers, as colPic information, information including the motion vectors in the prediction direction 1 and the prediction direction 2 and others, to the prediction-direction-1 area and the prediction-direction-2 area of the colPic memory, and stores the information (Step S507). More specifically, when the co-located block unidirectionality storage flag indicates ON, the inter prediction control unit 109 stores information including the motion vector of the current block in the prediction direction 1 or the prediction direction 2 and others in the prediction-direction-1 area of the colPic memory. When the co-located block unidirectionality storage flag indicates OFF, the inter prediction control unit 109 stores information including the motion vectors of the prediction direction 1 and the prediction direction 2 and others, in the prediction-direction-1 area and the prediction-direction-2 area in the colPic memory.

In this embodiment, in Step S506 in FIG. 12, colPic information is not transferred to the colPic memory; however, it may be that colPic information is transferred which includes information indicating that the motion vector in each prediction direction of the current block is not available.

Accordingly, the present invention uses new criteria for appropriately controlling motion vector information to be stored in the memory in the temporal motion vector predictor mode. This allows a reduction in the necessary memory capacity and necessary bandwidth in the temporal motion vector predictor mode.

More specifically, when the co-located block unidirectionality storage flag indicates ON, information including the motion vector of the current block in the prediction direction 1 or the prediction direction 2 and others is stored in the prediction-direction-1 area of the colPic memory. For obtaining a temporal motion vector predictor, control is made such that the colPic information is read from the prediction-direction-1 area of the colPic memory. Furthermore, when the co-located block unidirectionality storage flag indicates OFF, information including the motion vectors in the prediction direction 1 and the prediction direction 2 and others is stored in the prediction-direction-1 area and the prediction-direction-2 area of the colPic memory. For obtaining a temporal motion vector predictor, a reference motion vector most suitable for the current block can be selected according to the co-located reference direction flag. As a result, it is possible to increase the compression rate. In particular, when the co-located block is a forward reference block, the use of the backward reference motion vector allows a reduction in the prediction error. The backward reference motion vector is a motion vector directed from a picture including the co-located block to a picture including the current block, and has a higher probability of approximating the most suitable motion vector, which reduces the prediction error. On the other hand, the forward reference motion vector is a motion vector in a direction opposite to the direction from the picture including the co-located block to the picture including the current block, and has a lower probability of approximating the most suitable motion vector, which increases the prediction error. Likewise, also in the case where the co-located block is a backward reference block, the prediction error can be reduced because the use of the forward reference motion vector leads to a higher probability of approximating the most suitable motion vector.

In this embodiment, when the co-located block has two or more motion vectors, the motion vector of the co-located block to be used for calculating the temporal motion vector predictor of the current block is changed according to whether the co-located block is a backward reference block or a forward reference block. It may also be that the temporal motion vector predictor is calculated using the motion vector which refers to a reference picture that is temporally close to the picture which includes the co-located block (motion vector which has a short temporal distance). Here, for example, the temporal distance is determined according to the number of pictures in display time order between the picture including the co-located block and the reference picture to which the co-located block refers.

Furthermore, in this embodiment, when the co-located block has two or more motion vectors, the motion vector of the co-located block used for calculating the temporal motion vector predictor of the current block is changed according to whether the co-located block is a backward reference block or a forward reference block. It may also be that the temporal motion vector predictor is calculated using a motion vector having a smaller magnitude out of the two motion vectors of the co-located block. Here, the magnitude of the motion vector means, for example, an absolute value of the motion vector.

Embodiment 2

Figure 13:
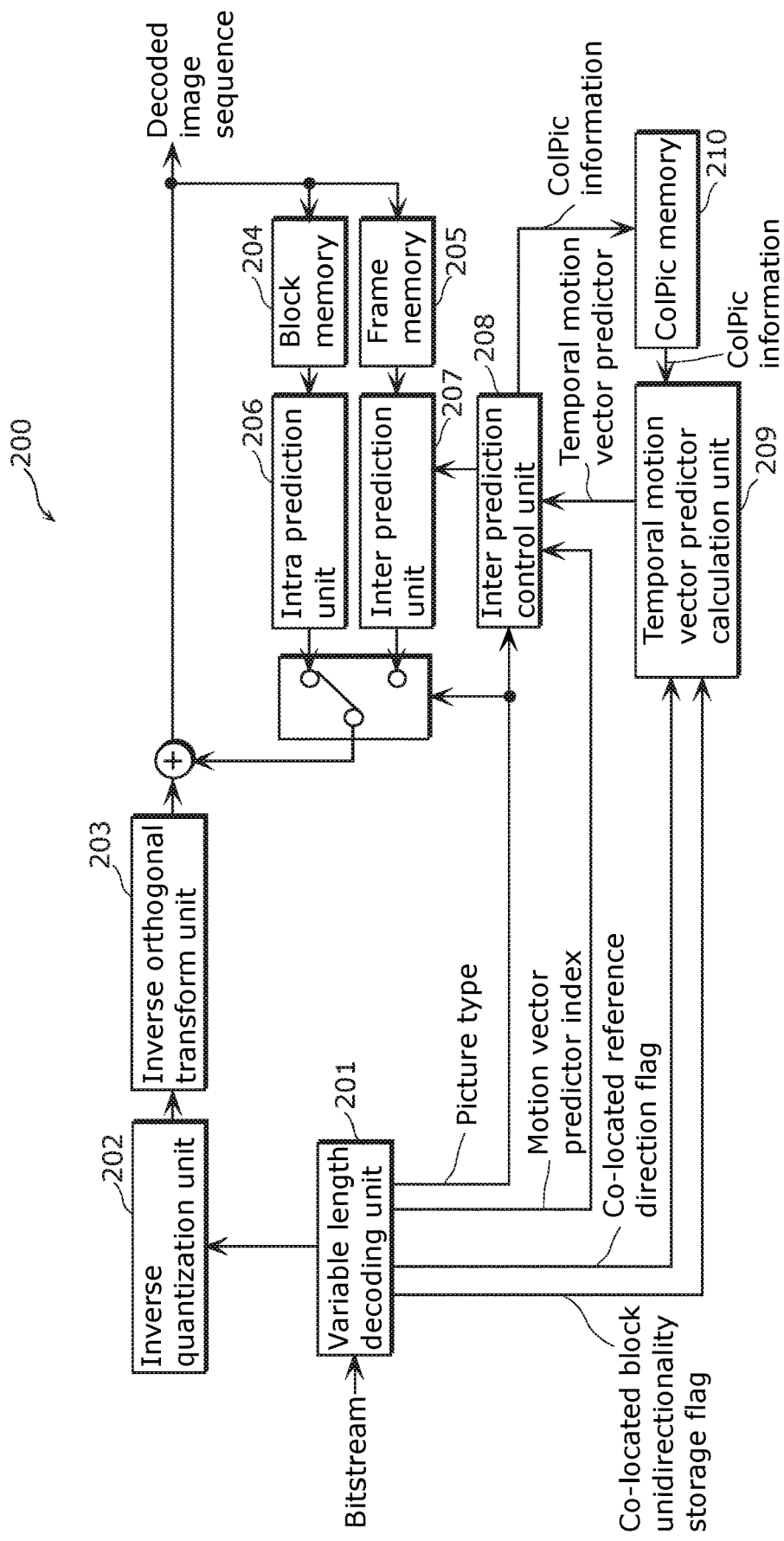
FIG. 13 is a block diagram showing a configuration of one embodiment of a moving picture decoding apparatus using a moving picture decoding method according to the present invention.

FIG. 13 is a block diagram showing a configuration of one embodiment of a moving picture decoding apparatus using a moving picture decoding method according to the present invention.

In Embodiment 2, a block included in a picture located, in display time order, before a current picture to be decoded is referred to as a forward reference block. Moreover, a block included in a picture located, in display time order, after the current picture is referred to as a backward reference block.

A moving picture decoding apparatus 200 includes, as shown in FIG. 13, a variable-length decoding unit 201, an inverse quantization unit 202, an inverse orthogonal transform unit 203, a block memory 204, a frame memory 205, an intra prediction unit 206, an inter prediction unit 207, an inter prediction control unit 208, a temporal motion vector predictor calculation unit 209, and a colPic memory 210.

The variable-length decoding unit 201 performs a variable-length decoding process on an input bitstream to generate picture type information, a motion vector predictor index, a co-located reference direction flag, a co-located block unidirectionality storage flag, and a bitstream on which the variable-length decoding process has been performed. The inverse quantization unit 202 performs an inverse quantization process on the bitstream on which the variable-length decoding process has been performed. The inverse orthogonal transform unit 203 transforms, from frequency domain into image domain, the bitstream on which the inverse quantization process has been performed, to generate prediction error image data. The block memory 204 stores, in units of blocks, an image sequence generated by adding the prediction error image data and prediction image data. The frame memory 205 stores the image sequence in units of frames. The intra prediction unit 206 performs intra prediction using the image sequence stored in units of blocks in the block memory 204, to generate prediction error image data for the current block. The inter prediction unit 207 performs inter prediction using the image sequence stored in units of frames in the frame memory 205, to generate prediction error image data for the current block.

The temporal motion vector predictor calculation unit 209 derives a candidate motion vector predictor (temporal motion vector predictor) in temporal motion vector predictor mode using colPic information such as a motion vector of the co-located block stored in the colPic memory 210. The temporal motion vector predictor calculation unit 209 also assigns a motion vector predictor index value corresponding to the temporal motion vector predictor. The temporal motion vector predictor calculation unit 209 transmits the temporal motion vector predictor and the motion vector predictor index to the inter prediction control unit 208. When the co-located block has no motion vector, it may be that the temporal motion vector predictor calculation unit 209 stops the derivation of a motion vector in the temporal motion vector predictor mode, or derives a candidate motion vector predictor (temporal motion vector predictor) assuming that the motion vector is 0.

The inter prediction control unit 208 determines, from among candidate motion vector predictors, a motion vector to be used for inter prediction, based on the motion vector predictor index. Moreover, the inter prediction control unit 208 calculates a motion vector to be used for inter prediction by adding the error information of the candidate motion vector predictor to the value of the determined candidate motion vector predictor. Furthermore, the inter prediction control unit 208 transfers, to the colPic memory, colPic information including the motion vector of the current block and others.

At the end, the decoded prediction image data and the prediction error image data are added up to generate a decoded image sequence.

Figure 14:
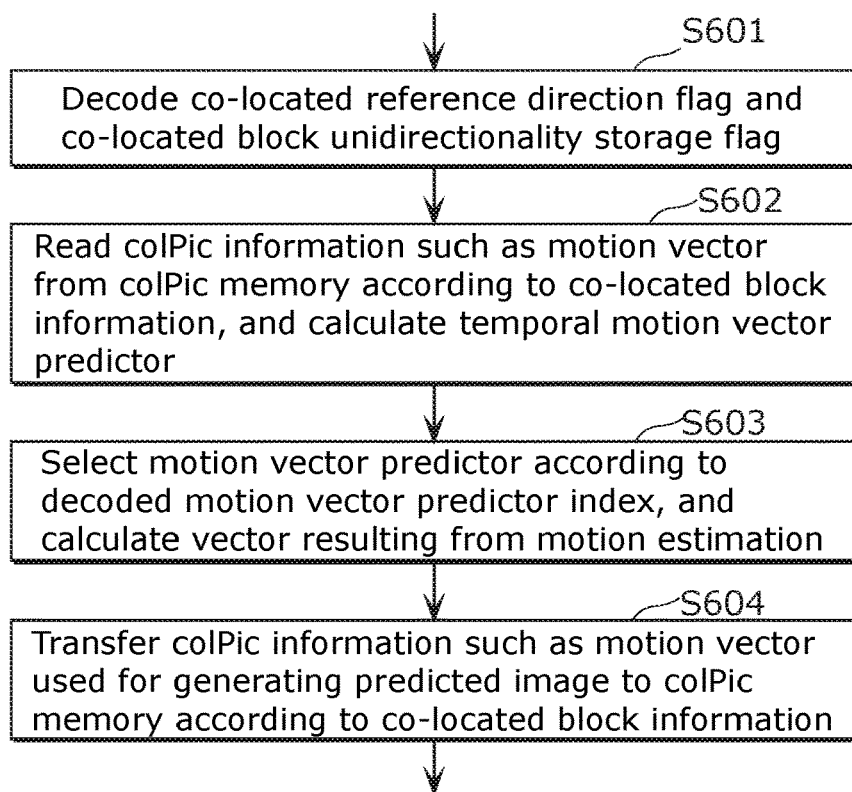
FIG. 14 shows an outline of a process flow of the moving picture decoding method according to the present invention.

FIG. 14 shows an outline of a process flow of the moving picture decoding method according to the present invention.

The variable-length decoding unit 201 decodes a co-located reference direction flag and a co-located block unidirectionality storage flag in units of pictures (Step S601). Next, the temporal motion vector predictor calculation unit 209 determines, based on the co-located reference direction flag, whether the forward reference block will be the co-located block or the backward reference block will be the co-located block. In the similar manner to FIG. 9, the temporal motion vector predictor calculation unit 209 reads, from the colPic memory, colPic information including a reference motion vector of the co-located block and others according to the co-located block information, and derives a candidate motion vector predictor (a temporal motion vector predictor) in the temporal motion vector predictor mode using the reference motion vector of the co-located block (Step S602). Next, the inter prediction control unit 208 determines, from among the candidate motion vector predictors, a motion vector predictor to be used for inter prediction, based on the motion vector predictor index decoded by the variable-length decoding unit 201 (Step S603). Moreover, the inter prediction control unit 208 derives a motion vector by adding error information to the determined motion vector predictor. The inter prediction control unit 208 then performs decoding through inter prediction using the derived motion vector. Subsequently, in the similar manner to FIG. 12, the inter prediction control unit 208 transfers, to the colPic memory 210, colPic information including the motion vector used for the inter prediction and others, and stores the information (Step S604). The colPic memory 210 stores motion vectors and index values of reference pictures, prediction direction and others for calculating a temporal motion vector predictor of a current block.

When the reference block has two or more reference motion vectors, the reference motion vector for calculating the temporal motion vector predictor may be selected based on other than the co-located reference direction flag. For example, it may be that a temporal distance of each of the reference motion vectors is calculated, and a reference motion vector having a short temporal distance is used. Here, the temporal distance is calculated based on the number of pictures in display time between the reference picture including the reference block and the picture to which the reference picture refers.

Furthermore, for example, it may be that the magnitudes of the reference motion vectors are calculated, and that the motion vector derived using the reference motion vector having a smaller magnitude is determined as the temporal motion vector predictor.

Accordingly, the present invention uses new criteria for appropriately controlling motion vector information to be stored in the memory in the temporal motion vector predictor mode. This allows appropriate decoding of a bitstream which requires less memory capacity and bandwidth in the temporal motion vector predictor mode.

More specifically, when the decoded co-located block unidirectionality storage flag indicates ON, such control is performed that information including the motion vector of the current block in the prediction direction 1 or the prediction direction 2 and others is stored in the prediction-direction-1 area of the colPic memory. For obtaining the temporal motion vector predictor, the colPic information is read from the prediction-direction-1 area of the colPic memory. Furthermore, when the co-located block unidirectionality storage flag indicates OFF, information including the motion vectors in the prediction direction 1 and the prediction direction 2 are stored in the prediction-direction-1 area and the prediction-direction-2 area of the colPic memory. For obtaining the temporal motion vector predictor, it is possible to appropriately decode a bitstream with the reference motion vector most suitable for the current block, according to the co-located reference direction flag.

Embodiment 3

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 15:
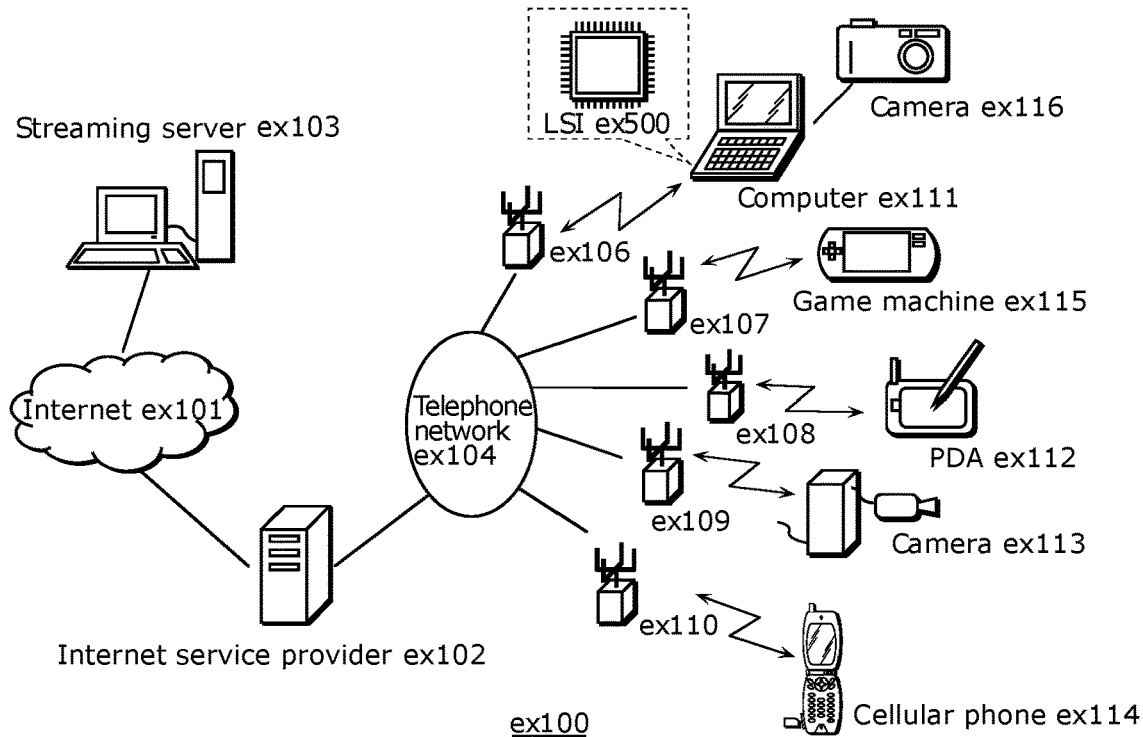
FIG. 15 shows an overall configuration of a content providing system for implementing content distribution services.

FIG. 15 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 15, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 16:
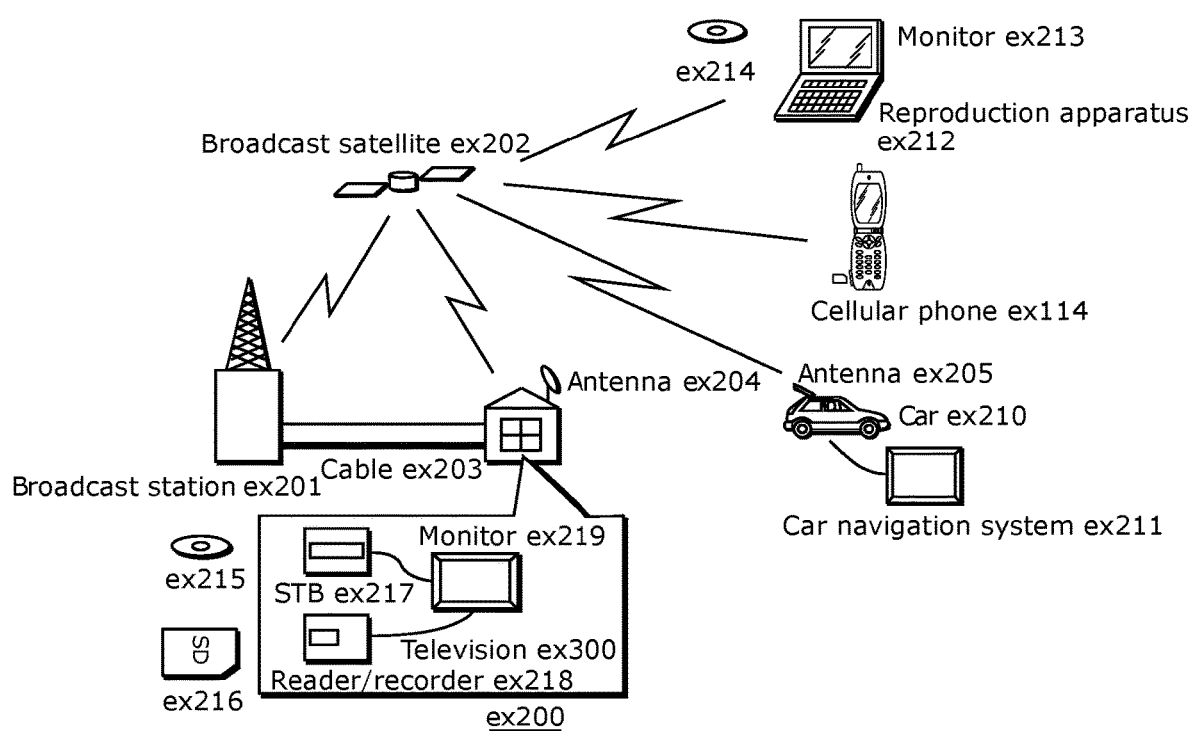
FIG. 16 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 16. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 17:
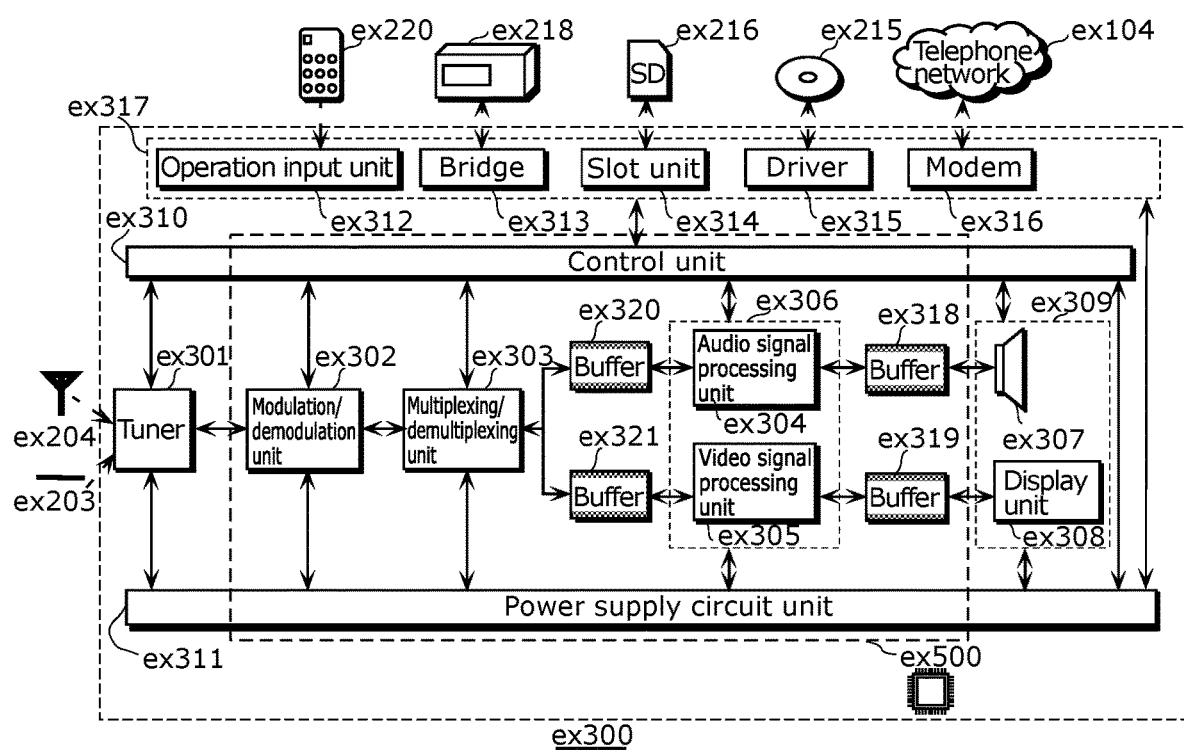
FIG. 17 shows a block diagram illustrating an example of a configuration of a television.

FIG. 17 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 18:
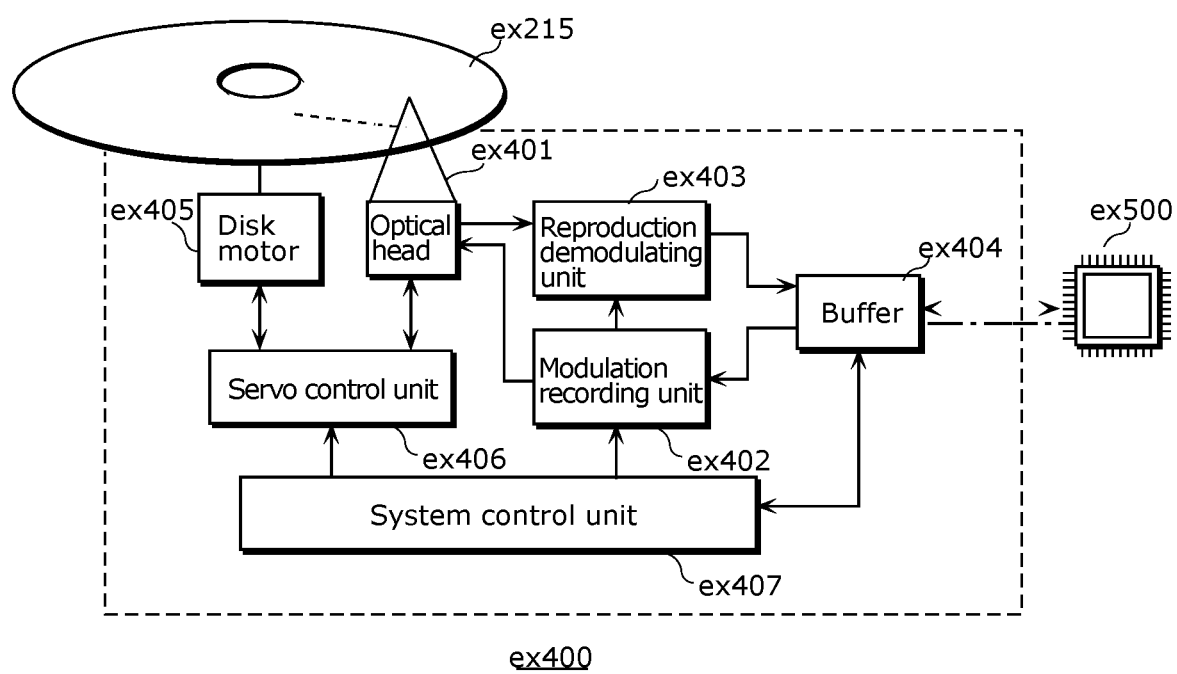
FIG. 18 shows a block diagram illustrating an example of a configuration of an information reproducing/recording unit that reads and writes information from and on a recording medium that is an optical disk.

As an example, FIG. 18 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 19:
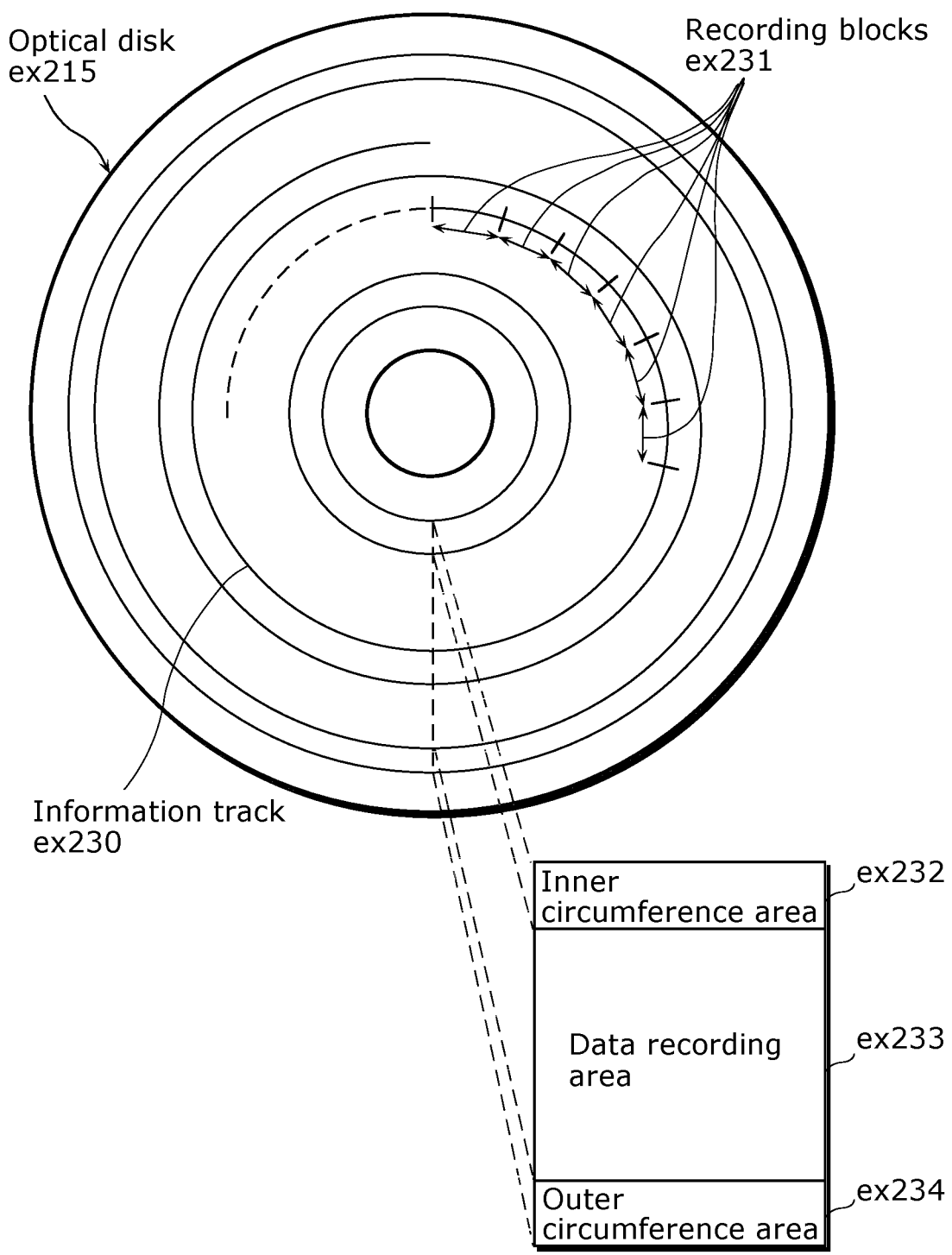
FIG. 19 shows an example of a configuration of a recording medium that is an optical disk.

FIG. 19 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 17. The same will be true for the configuration of the computer ex111, the cellular phone ex114, and others.

Figure 20A:
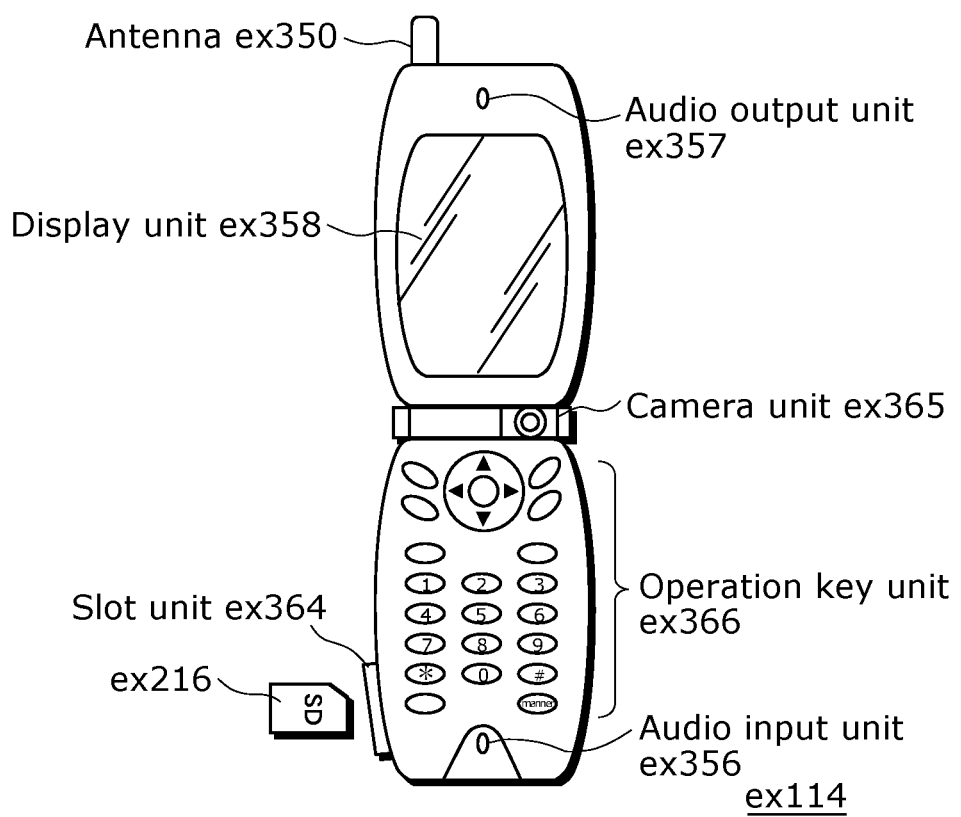
FIG. 20A shows an example of a cellular phone.

FIG. 20A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 20B:
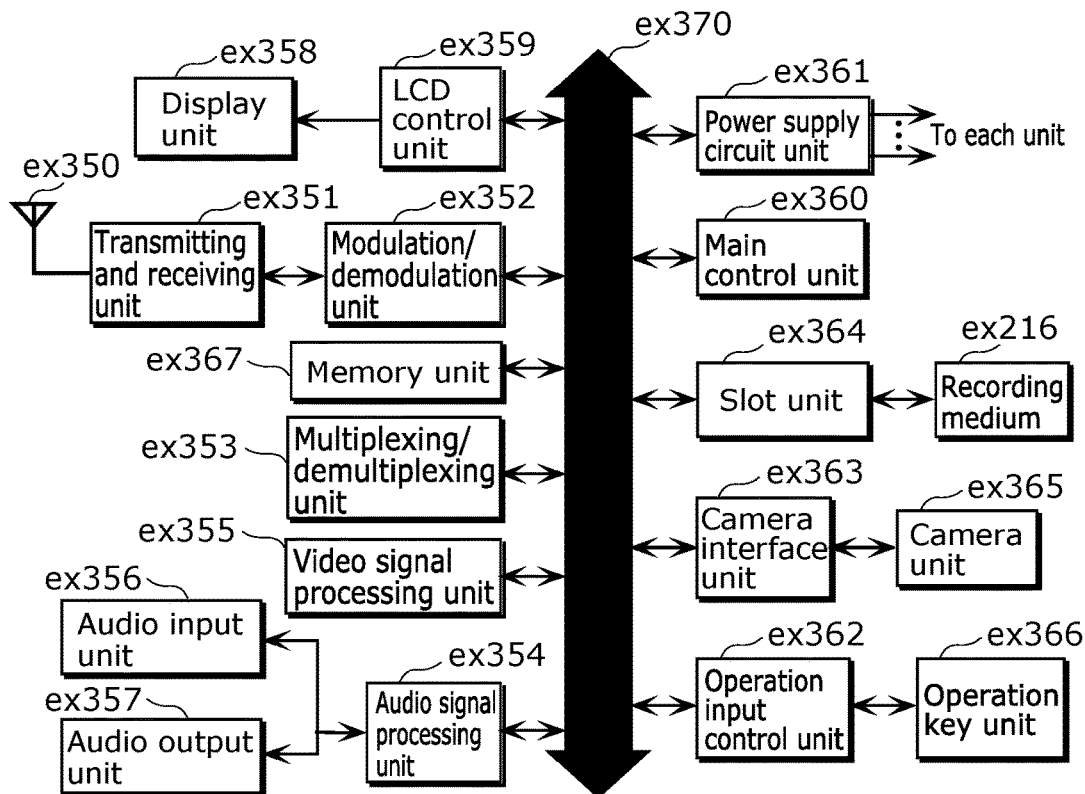
FIG. 20B is a block diagram showing an example of a configuration of a cellular phone.

Next, an example of a configuration of the cellular phone ex114 will be described with reference to FIG. 20B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bitstream and an audio data bitstream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 4

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 21:
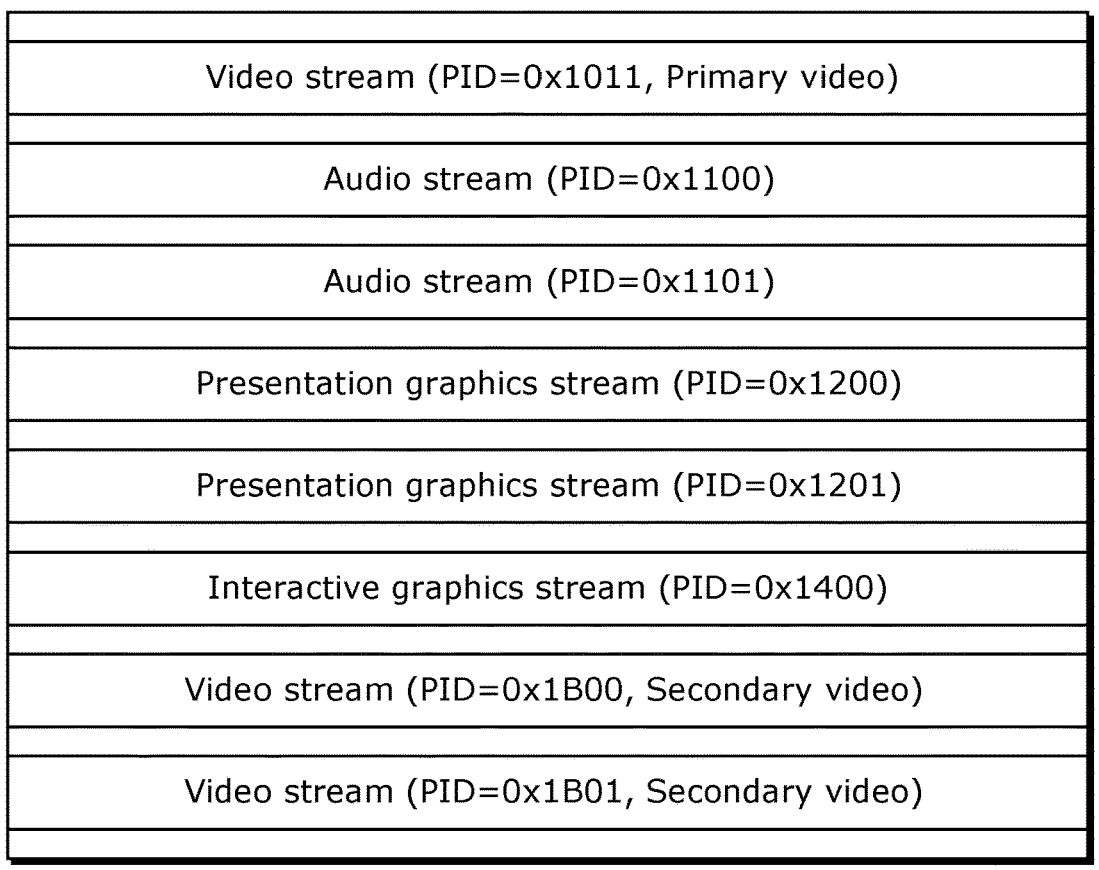
FIG. 21 illustrates a structure of the multiplexed data.

FIG. 21 illustrates a structure of the multiplexed data. As illustrated in FIG. 21, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 22:
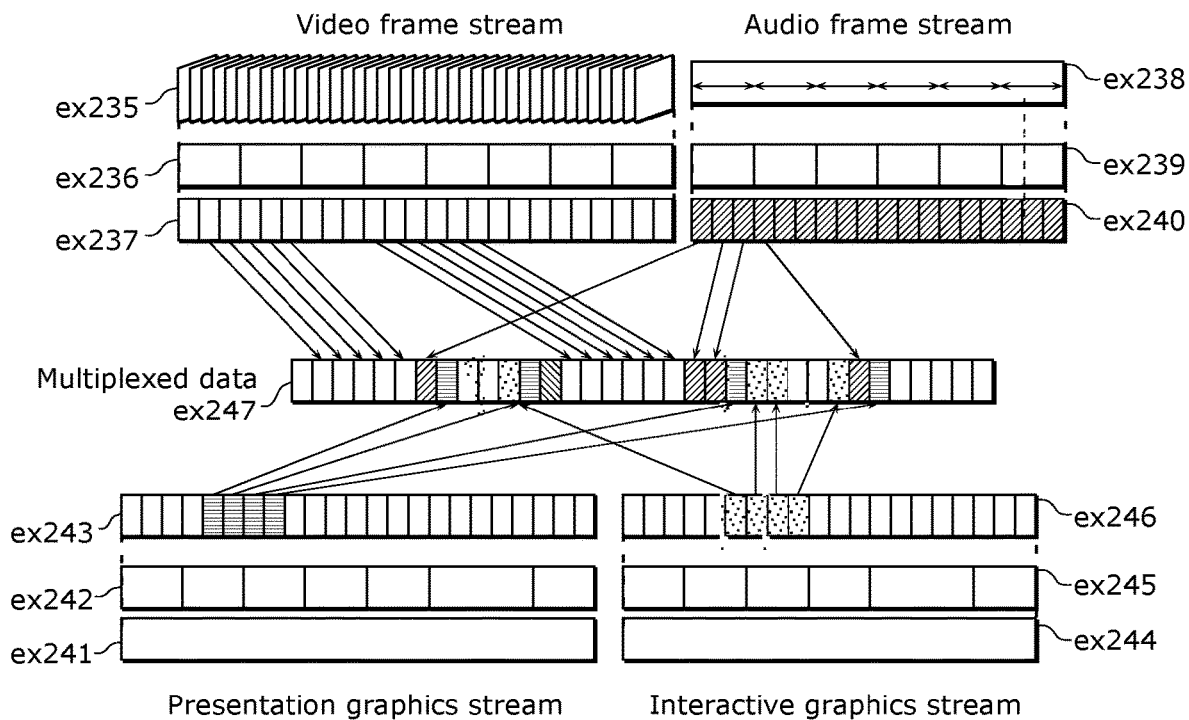
FIG. 22 schematically shows how each stream is multiplexed in multiplexed data.

FIG. 22 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 23:
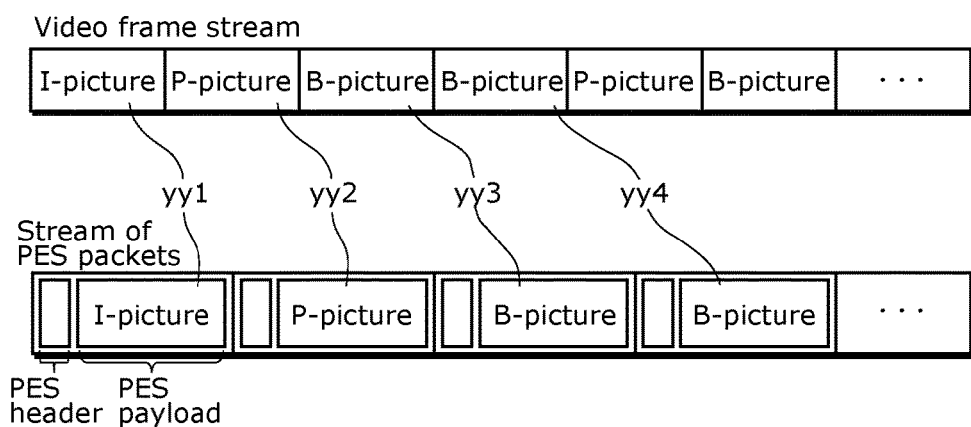
FIG. 23 shows how a video stream is stored in a stream of PES packets in more detail.

FIG. 23 illustrates how a video stream is stored in a stream of PES packets in more detail. The first bar in FIG. 23 shows a video frame stream in a video stream. The second bar shows the stream of PES packets. As indicated by arrows denoted as yy1, yy2, yy3, and yy4 in FIG. 23, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 24:
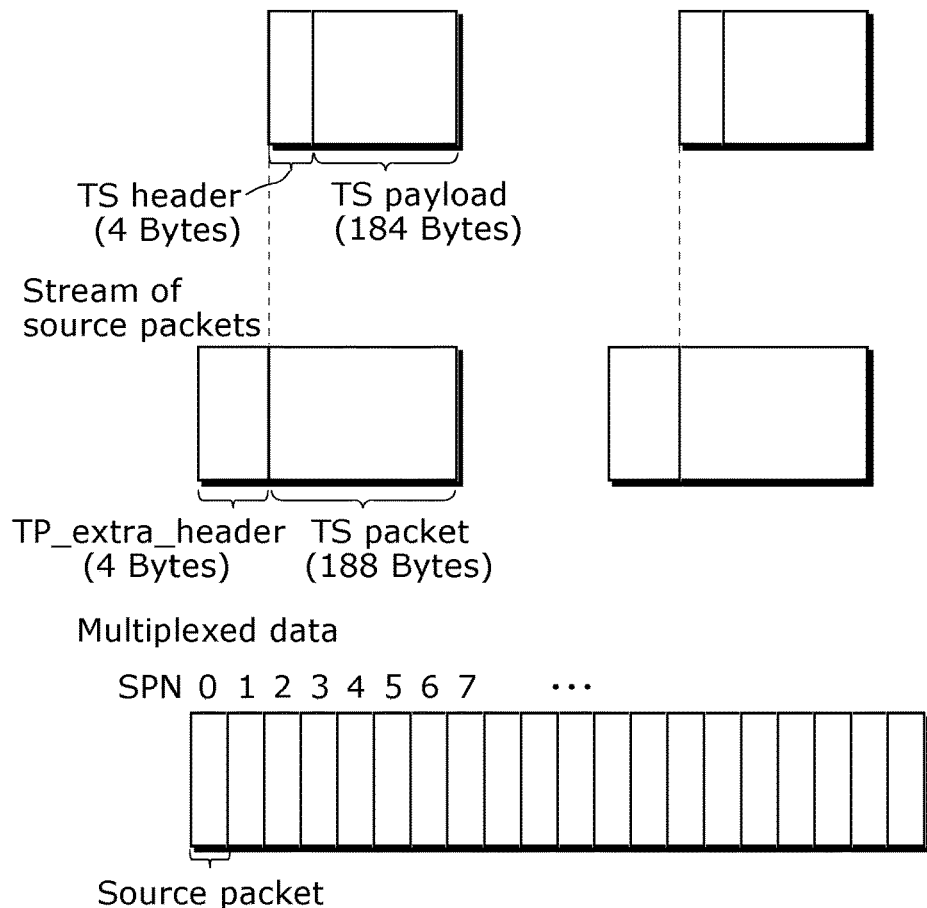
FIG. 24 shows a structure of TS packets and source packets in the multiplexed data.

FIG. 24 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 24. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 25:
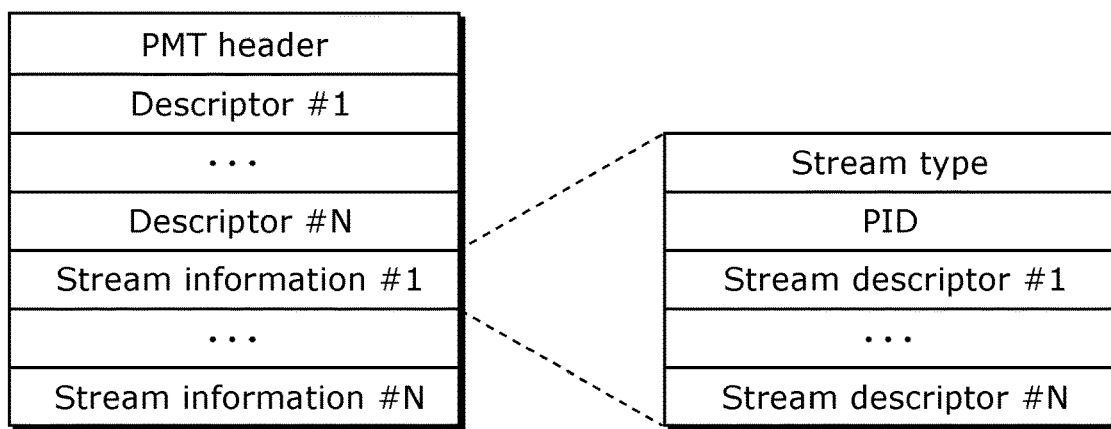
FIG. 25 shows a data structure of a PMT.

FIG. 25 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data. The stream descriptors are equal in number to the number of streams in the multiplexed data.

When the multiplexed data is recorded on a recording medium and others, it is recorded together with multiplexed data information files.

Figure 26:
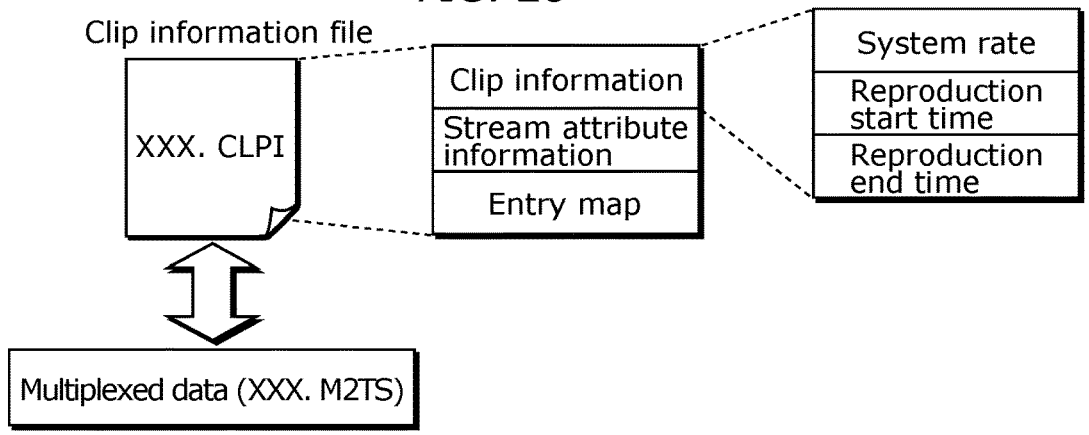
FIG. 26 shows an internal structure of multiplexed data information.

Each of the multiplexed data information files is management information of the multiplexed data as shown in FIG. 26. The multiplexed data information files are in one to one correspondence with the multiplexed data, and each of the files includes multiplexed data information, stream attribute information, and an entry map.

As illustrated in FIG. 26, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 27:
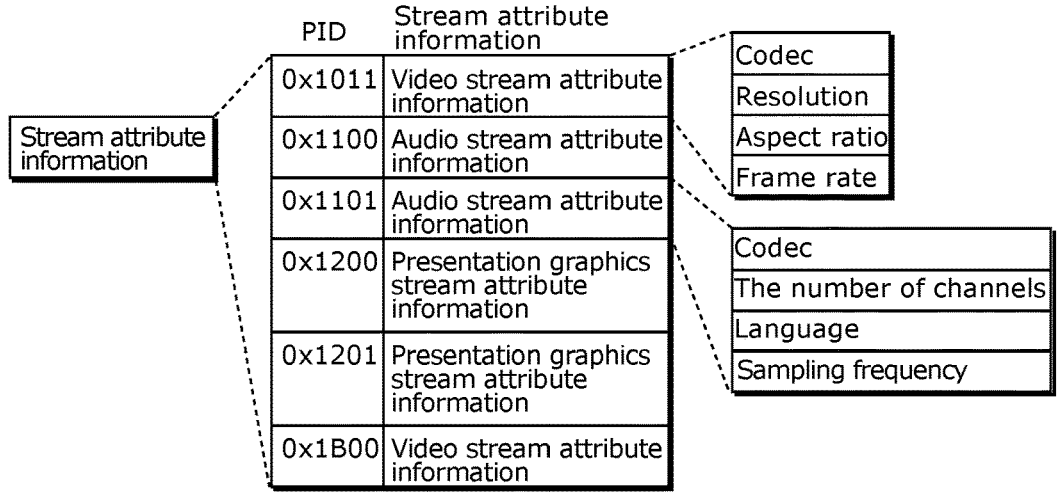
FIG. 27 shows an internal structure of stream attribute information.

As shown in FIG. 27, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 28:
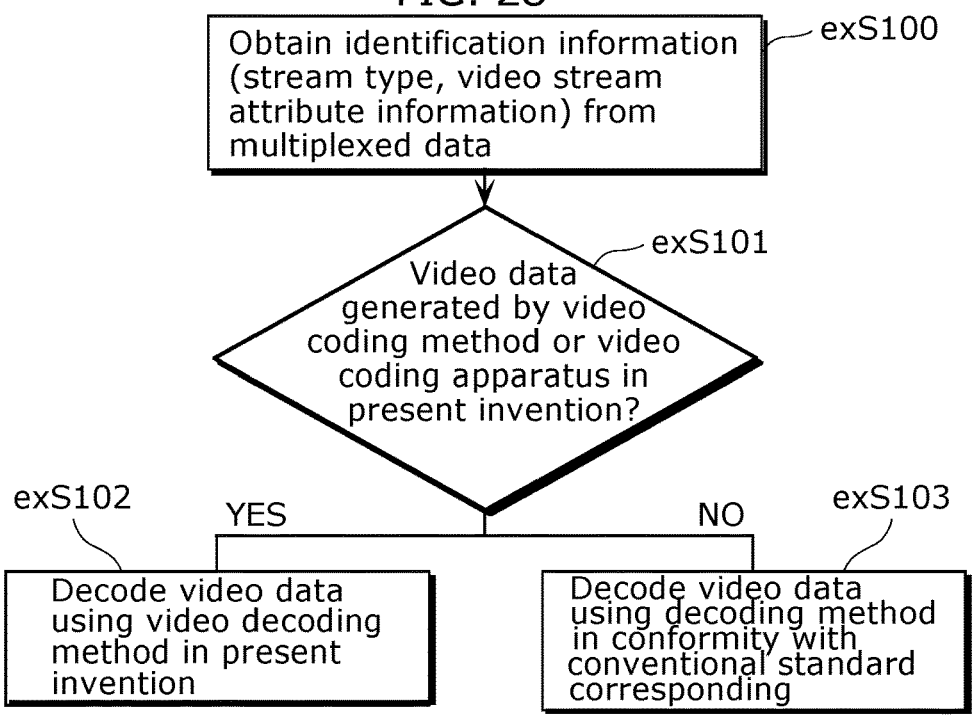
FIG. 28 shows steps for identifying video data.

Furthermore, FIG. 28 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 5

Figure 29:
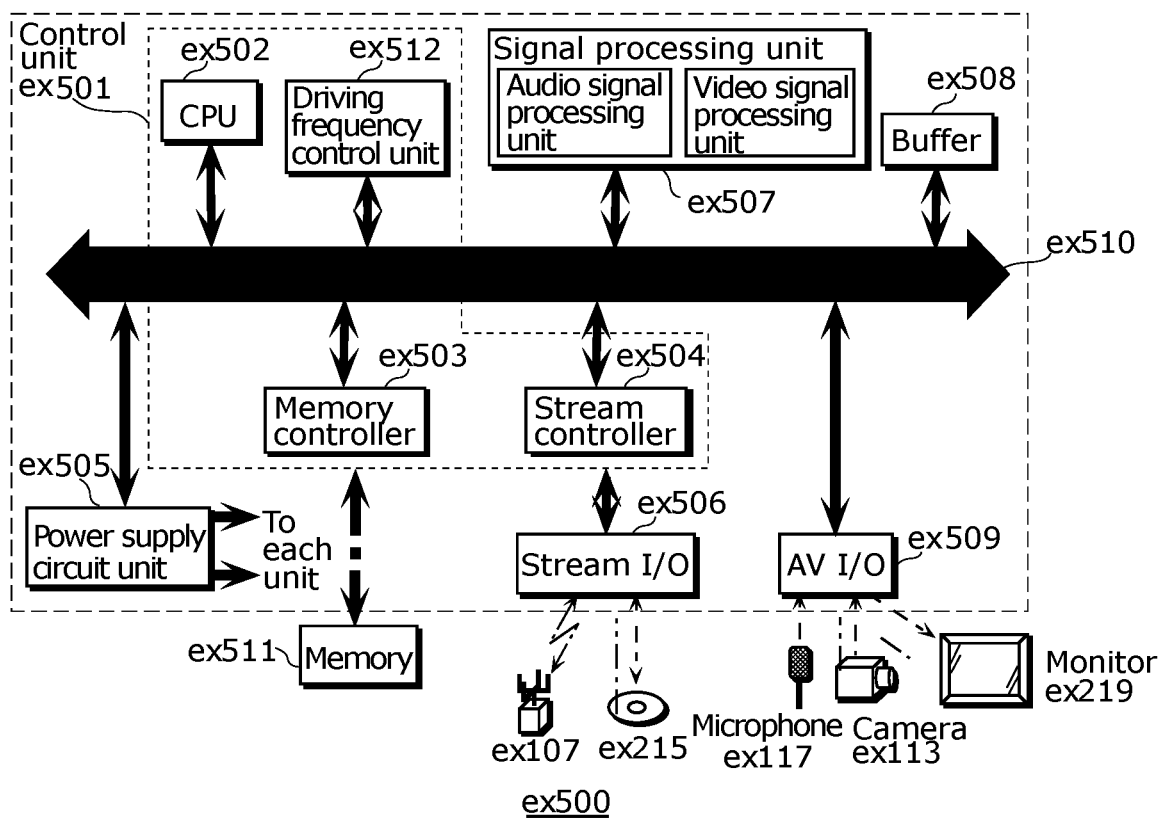
FIG. 29 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 29 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 30:
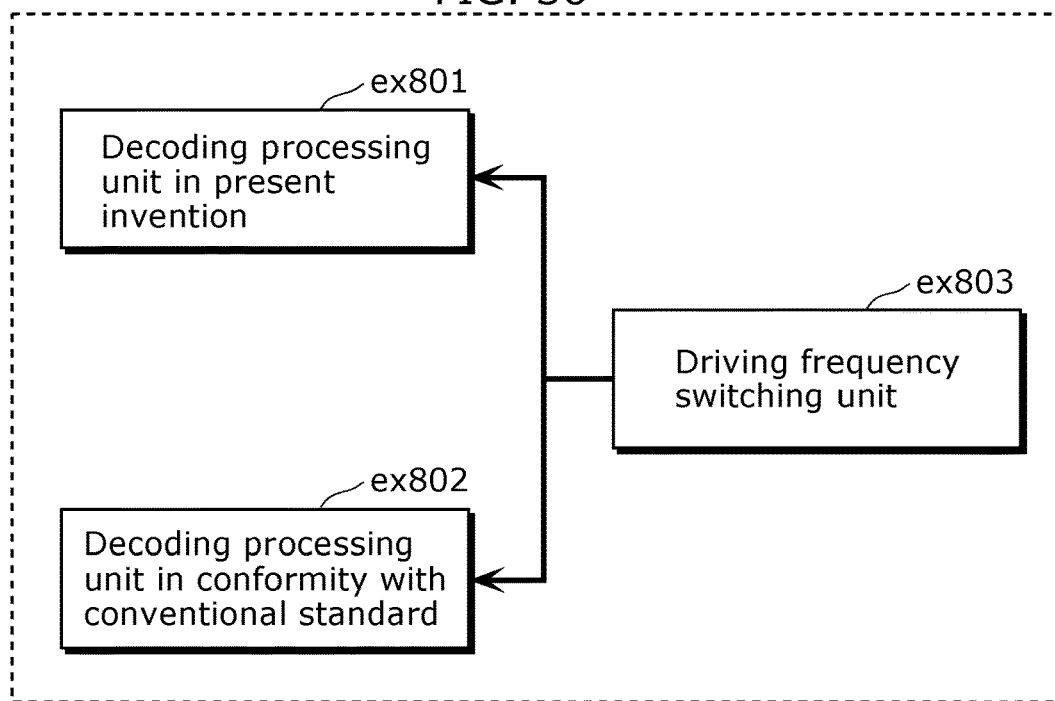
FIG. 30 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 30 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

Figures 32, 33A:
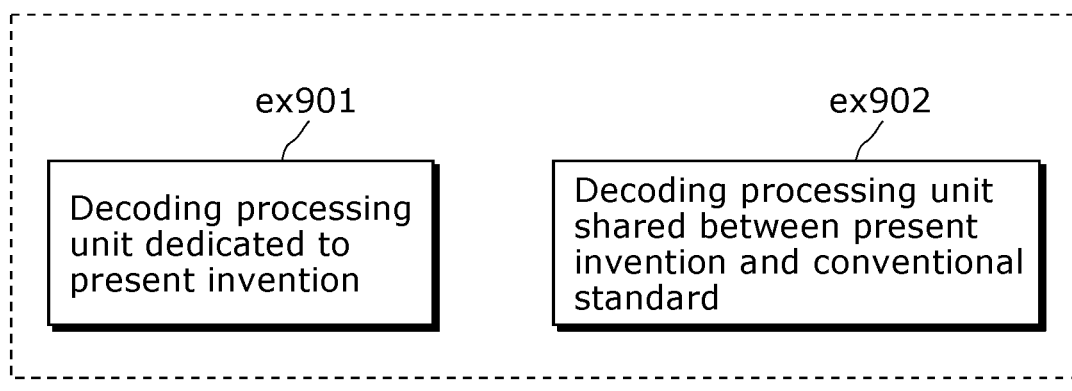
FIG. 32 shows an example of a look-up table in which video data standards are associated with driving frequencies.
FIG. 33A is a diagram showing an example of a configuration for sharing a module of a signal processing unit.

More specifically, the driving frequency switching unit ex803 includes the CPU ex502 and the driving frequency control unit ex512 in FIG. 29. Here, each of the decoding processing unit ex801 that executes the moving picture decoding method described in each of embodiments and the decoding processing unit ex802 that conforms to the conventional standard corresponds to the signal processing unit ex507 in FIG. 29. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 32. The driving frequency can be selected by storing the look-up table in the buffer ex508 and in an internal memory of an LSI, and with reference to the look-up table by the CPU ex502.

Figure 31:
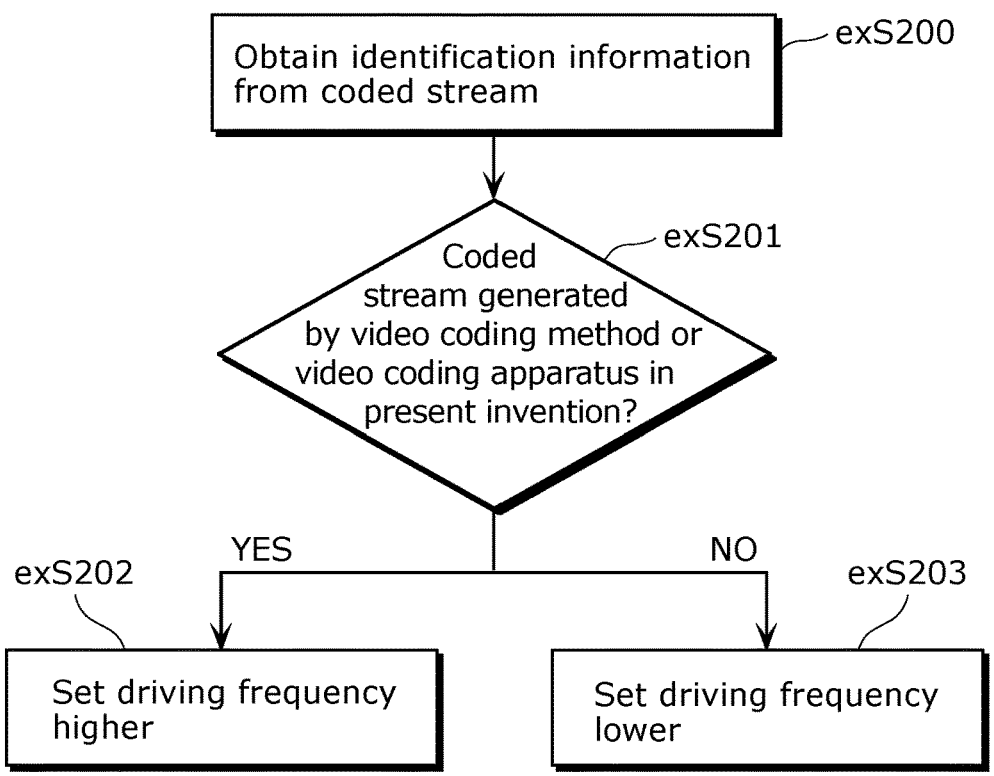
FIG. 31 shows steps for identifying video data and switching between driving frequencies.

FIG. 31 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 33A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. The decoding processing unit for implementing the moving picture decoding method described in each of embodiments may be shared for the processing to be shared, and a dedicated decoding processing unit may be used for processing unique to that of MPEG-4 AVC.

Figure 33B:
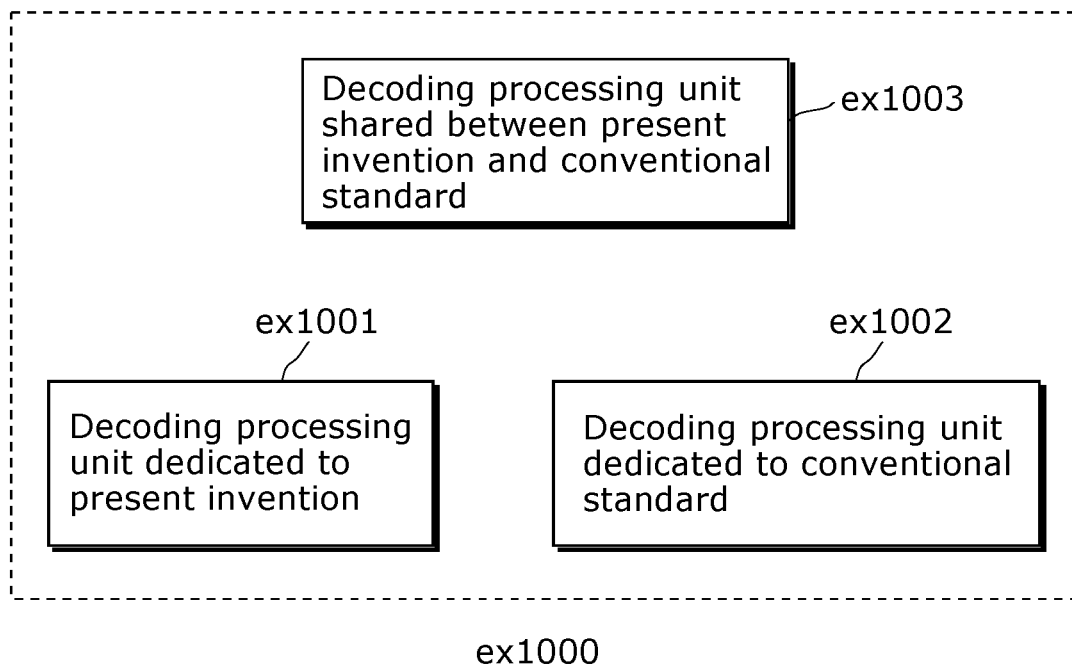
FIG. 33B is a diagram showing another example of a configuration for sharing a module of the signal processing unit.

Furthermore, ex1000 in FIG. 33B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method in the present invention and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The moving picture coding method and the moving picture decoding method according to an implementation of the present invention can be applied to every multimedia data, makes it possible to increase a compression rate, and are useful as a moving picture coding method and a moving picture decoding method in accumulation, transmission, communication, and so on performed using, for example, cellular phones, DVD devices, and personal computers.

REFERENCE SIGNS LIST

100 Moving picture coding apparatus
101 Orthogonal transform unit
102 Quantization unit
103 Inverse quantization unit
104 Inverse orthogonal transform unit
105 Block memory
106 Frame memory
107 Intra prediction unit 108 Inter prediction unit
109 Inter prediction control unit
110 Picture type determination unit
111 Temporal motion vector predictor calculation unit
112 ColPic memory
113 Co-located block information determination unit
114 Variable-length coding unit
200 Moving picture decoding apparatus
201 Variable-length decoding unit
202 Inverse quantization unit
203 Inverse orthogonal transform unit
204 Block memory
205 Frame memory
206 Intra prediction unit
207 Inter prediction unit
208 Inter prediction control unit
209 Temporal motion vector predictor calculation unit
210 ColPic memory

The invention claimed is:

1. A decoding method comprising:
selecting only a motion vector in a first direction from a plurality of motion vectors used to decode a reference frame, the plurality of motion vectors including the motion vector in the first direction and a motion vector in a second direction, the reference frame being different from a current picture; and
deriving a motion vector of a current block included in the current picture, the motion vector of the current block being derived using (i) the selected motion vector in the first direction and (ii) the number of frames between the reference frame and a frame referred by the reference frame.

2. The decoding method of claim 1, wherein the reference frame includes a reference block having the motion vector in the first direction to be selected, a position of the reference block corresponding to a position of the current block.

3. The decoding method of claim 2, wherein the position of the reference block is co-located with the position of the current block.

4. The decoding method of claim 1, wherein the first direction and the second direction are a backward direction and a forward direction, respectively, or the first direction and the second direction are the forward direction and the backward direction, respectively.

5. The decoding method of claim 1, wherein a reference block included in the reference frame has been decoded by using the motion vector in the first direction and the motion vector in the second direction.

6. The decoding method of claim 1, wherein the motion vector of the current block is derived by scaling the selected motion vector in the first direction using the number of frames between the reference frame and the frame referred by the reference frame.

* * * * *